(12) United States Patent
Sharma et al.

(10) Patent No.: US 11,794,181 B2
(45) Date of Patent: Oct. 24, 2023

(54) METHODS OF PRODUCING HYDROGEN-SELECTIVE OXYGEN CARRIER MATERIALS

(71) Applicant: Dow Global Technologies LLC, Midland, MI (US)

(72) Inventors: Manish Sharma, Missouri City, TX (US); Brian W. Goodfellow, Sugarland, TX (US); David F. Yancey, Midland, MI (US); Andrzej Malek, Midland, MI (US); Eric E. Stangland, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 262 days.

(21) Appl. No.: 17/271,093

(22) PCT Filed: Aug. 27, 2019

(86) PCT No.: PCT/US2019/048298
§ 371 (c)(1),
(2) Date: Feb. 24, 2021

(87) PCT Pub. No.: WO2020/046902
PCT Pub. Date: Mar. 5, 2020

(65) Prior Publication Data
US 2021/0245146 A1 Aug. 12, 2021

Related U.S. Application Data

(60) Provisional application No. 62/725,508, filed on Aug. 31, 2018, provisional application No. 62/725,504, filed on Aug. 31, 2018.

(51) Int. Cl.
*B01J 35/00* (2006.01)
*B01J 23/28* (2006.01)
(Continued)

(52) U.S. Cl.
CPC .......... *B01J 35/0006* (2013.01); *B01J 23/28* (2013.01); *B01J 23/30* (2013.01); *B01J 23/34* (2013.01);
(Continued)

(58) Field of Classification Search
CPC ...... B01J 35/0073; B01J 35/008; B01J 23/28; B01J 35/0006; B01J 23/30; B01J 23/34;
(Continued)

(56) References Cited

U.S. PATENT DOCUMENTS 4,806,624 A   2/1989 Herber et al.
4,827,066 A   5/1989 Herber et al.
(Continued)

FOREIGN PATENT DOCUMENTS

CN   1172790 A    2/1998
CN   103649234 A  3/2014
(Continued)

OTHER PUBLICATIONS

Galinsky et al. ACS SustainableChem. Eng.2013,1,364-373 (Year: 2013).*
(Continued)

*Primary Examiner* — Anthony J Zimmer
*Assistant Examiner* — Jordan W Taylor
(74) *Attorney, Agent, or Firm* — Dinsmore & Shohl LLP

(57) ABSTRACT

Embodiments of the present disclosure are directed to methods of producing a hydrogen-selective oxygen carrier material comprising combining one or more core material precursors and one or more shell material precursors to from a precursor mixture and heat-treating the precursor mixture at a treatment temperature to form the hydrogen-selective oxygen carrier material. The treatment temperature is greater than or equal to 100° C. less than the melting point of a shell material, and the hydrogen-selective oxygen carrier material
(Continued)

comprises a core comprising a core material and a shell comprising the shell material. The shell material may be in direct contact with at least a majority of an outer surface of the core material.

12 Claims, 16 Drawing Sheets

(51) Int. Cl.
    *B01J 23/30*     (2006.01)
    *B01J 23/34*     (2006.01)
    *B01J 23/745*     (2006.01)
    *B01J 23/75*     (2006.01)
    *B01J 23/888*     (2006.01)
    *B01J 35/02*     (2006.01)
    *B01J 37/02*     (2006.01)
    *B01J 37/08*     (2006.01)
    *C01B 3/26*     (2006.01)
    *B01J 37/04*     (2006.01)
    *B02C 17/24*     (2006.01)
    *C01G 45/02*     (2006.01)
    *C01G 45/12*     (2006.01)
    *C01G 49/06*     (2006.01)
    *C01G 51/04*     (2006.01)

(52) U.S. Cl.
CPC ............ *B01J 23/745* (2013.01); *B01J 23/75* (2013.01); *B01J 23/888* (2013.01); *B01J 35/0086* (2013.01); *B01J 35/026* (2013.01); *B01J 37/0201* (2013.01); *B01J 37/0221* (2013.01); *B01J 37/04* (2013.01); *B01J 37/088* (2013.01); *B02C 17/24* (2013.01); *C01B 3/26* (2013.01); *C01G 45/02* (2013.01); *C01G 45/1264* (2013.01); *C01G 49/06* (2013.01); *C01G 51/04* (2013.01); *C01P 2004/04* (2013.01); *C01P 2004/84* (2013.01)

(58) Field of Classification Search
CPC ........ B01J 23/745; B01J 23/75; B01J 23/888; B01J 35/026; B01J 37/0201; B01J 37/0221; B01J 37/088; C01B 3/26; C01P 2004/84
See application file for complete search history.

(56) References Cited

U.S. PATENT DOCUMENTS

| | | | |
|---|---|---|---|
| 5,430,209 | A | 7/1995 | Agaskar et al. |
| 5,430,210 | A | 7/1995 | Grasselli et al. |
| 5,527,979 | A | 6/1996 | Agaskar et al. |
| 5,563,314 | A | 10/1996 | Agaskar et al. |
| 5,935,889 | A * | 8/1999 | Murrell ............... B01J 2/006 502/355 |
| 6,177,381 | B1 * | 1/2001 | Jensen ............... B01J 37/0246 428/404 |
| 6,525,232 | B1 | 2/2003 | Bierl et al. |
| 6,576,804 | B1 | 6/2003 | Heineke et al. |
| 7,122,492 | B2 | 10/2006 | Ou et al. |
| 7,122,493 | B2 | 10/2006 | Ou et al. |
| 7,122,494 | B2 | 10/2006 | Ou et al. |
| 7,122,495 | B2 | 10/2006 | Ou et al. |
| 7,125,817 | B2 | 10/2006 | Ou et al. |
| 8,669,406 | B2 | 3/2014 | Pretz et al. |
| 9,370,759 | B2 | 6/2016 | Pretz et al. |
| 2004/0010174 | A1 | 1/2004 | Wang et al. |
| 2005/0177016 | A1 | 8/2005 | Sanfilippo et al. |
| 2016/0318828 | A1 | 11/2016 | Washburn et al. |
| 2017/0313637 | A1 | 11/2017 | Sofranko et al. |

FOREIGN PATENT DOCUMENTS

| | | |
|---|---|---|
| CN | 105792912 A | 7/2016 |
| CN | 108348907 A | 7/2021 |
| EP | 482276 A1 | 4/1992 |
| WO | 8504821 A1 | 11/1985 |
| WO | 2005077867 A2 | 8/2005 |
| WO | 2010133565 A1 | 11/2010 |
| WO | 2016049144 A1 | 3/2016 |
| WO | 2016209811 A1 | 12/2016 |
| WO | 2018005456 A1 | 1/2018 |
| WO | 2018025117 A1 | 2/2018 |
| WO | 2018049389 A1 | 3/2018 |
| WO | 2018232133 A1 | 12/2018 |

OTHER PUBLICATIONS

Fujishima et al. Nature vol. 238, pp. 37-38 (1972) (Year: 1972).*
Ji et al. Journal of Catalysis 220 (2003) 47-56 (Year: 2003).*
Yusuf et al. ACS Catal. 2017, 7, 5163-5173 (Year: 2017).*
European Communication pursuant to 94(3) EPC, pertaining to EP 197739696.6, dated Apr. 4, 12, 2022.
Geldart, D., "Types of Gas Fluidization," Powder Technology, 1973, 7, 285-292.
Geldart, D., "Gas Fluidization Technology", John Wiley & Sons (New York, 1986), 38-48.
Cavani et al., "Alternative Processes for the Production of Styrene", Applied Catalysis A: General, 1995, 219-239.
Shafiefarhood et al., "Fe2O3@LaxSr1—xFeO3 Core-shell redox Catalyst for Methane Partial Oxidation", Chemcatchem, 2014, 790-799.
Yusuf et al., "Effect of Promoters on Manganese-Containing Mixed Metal Oxides for Ocidative Dehydrogenation of Ethane via a Cyclic Redox Scheme" , ACS Catalysis, 2017, 5163-5173.
International Search Report and Written Opinion pertaining to PCT/US2019/048290, dated Nov. 19, 2019.
International Search Report and Written Opinion pertaining to PCT/US2019/048298, dated Dec. 4, 2019.
International Search Report and Written Opinion pertaining to PCT/US2019/048391, dated Dec. 11, 2019.
Yusuf et al., "Effects of Sodium and Tungsten Promoters on Mg6MnO8-Based Core-shell Redox Catalysts for Chemical Looping-Oxidative Dehydrogenation of Ethane", ACS Catalysis, 2019, 3174-3186.
Xu et al., "Self-assembly Template Combustion Synthesis of a Core-shell CuO@TiO2—Al2O3 Hierarchical Structure as an Oxygen Carrier for the Chemical-lopping Processes", Combustion and Flame, 2015, 3030-3045.
Neal et al., "Oxidative Dehydrogenation of Ethane: a Chemical Looping Approach", Energy Technology, 2016, 4, 1200-1208.
Ryan B. Dudek, et al., "Manganese-containing redox catalysts for selective hydrogen combustion under a cyclic redox scheme," AICHE journal, vol. 64, No. 8, pp. 3141-3150 (2015).
Yunfei Gao, et al., "Li-Promoted LaxSr2—xFeO4?δ Core-Shell Redox Catalysts for Oxidative Dehydrogenation of Ethane under a Cyclic Redox Scheme," ACS Catalysis, vol. 6, No. 11, pp. 7293-7302 (2016).
Petr Novotny, et al., "Oxidative dehydrogenation of ethane using MoO3/Fe2O3 catalysts in a cyclic redox mode," Catalysis Today, vol. 317, pp. 50-55 (2018).
Ming-Lei Yang, et al., "Selective Oxidation of Hydrogen in the Presence of Propylene over Pt-Based Core-Shell Nanocatalysts," The Journal of Physical Chemistry C, vol. 119, No. 37, pp. 21386-21394 (2015).
Mahmut Yildiz, "Influences of Support Material Variation on Structure and Catalytic Performance of MnxOy—Na2WO4/SiO2 Catalyst for the Oxidative Coupling of Methane," von der Fakultät II—Mathematik und Naturwissenschaften, pp. 1-249 (2014).
Chinese Search Report issued by the Chinese Patent Office for Chinese Patent Application No. 201980054784.7 dated Nov. 24, 2022 (5 total pages).

(56) References Cited

OTHER PUBLICATIONS

Chinese Office Action issued by the Chinese Patent Office for Chinese Patent Application No. 201980054784.7 dated Dec. 1, 2022 (6 total pages).
Chinese Search Report issued by the Chinese Patent Office for Chinese Patent Application No. 201980055786.8 dated Dec. 1, 2022 (5 total pages).
Chinese Office Action issued by the Chinese Patent Office for Chinese Patent Application No. 201980055786.8 dated Dec. 1, 2022 (7 total pages).

* cited by examiner

METHODS OF PRODUCING HYDROGEN-SELECTIVE OXYGEN CARRIER MATERIALS

CROSS-REFERENCE TO RELATED APPLICATIONS

This application is a National Stage Entry under 35 U.S.C. § 371 of International Patent Application No. PCT/US2019/048298, entitled "METHODS OF PRODUCING HYDROGEN-SELECTIVE OXYGEN CARRIER MATERIALS", filed Aug. 27, 2019, which claims priority to U.S. Provisional Patent Application No. 62/725,504, entitled "METHODS OF PRODUCING HYDROGEN-SELECTIVE OXYGEN CARRIER MATERIALS," filed on Aug. 31, 2018; and U.S. Provisional Patent Application No. 62/725,508, entitled "HYDROGEN-SELECTIVE OXYGEN CARRIER MATERIALS AND METHODS OF USE," filed on Aug. 31, 2018, the entire disclosures of which are hereby incorporated by reference.

TECHNICAL FIELD

Embodiments described herein generally relate to materials utilized in chemical processing and, more specifically, to oxygen carrier materials.

BACKGROUND

Some conventional processes utilize oxygen carrier materials in chemical processing applications. Conventional oxygen carrier materials generally include redox-active metal oxides. In such processes, oxygen may be delivered or "carried" in a cycle via a reduction and subsequent oxidation of the metal oxide.

SUMMARY

For example, combustion reactions may utilize oxygen from an oxygen carrier material. Oxygen carriers may be utilized in chemical processes that require oxygen. In such processes, the oxygen present in the metal oxide of the oxygen carrier material may be utilized as the source of oxygen. When producing oxygen carrier materials, manufacturers may be concerned with factors such as the cost of production, the cost of materials, and the effectiveness of the final product for use in specific processes.

In some chemical processes, there is a need for methods of forming oxygen carrier materials with high selectivity for hydrogen combustion over the combustion of other materials, such as hydrocarbons. One example may include dehydrogenation processes. It is contemplated that one way to increase the equilibrium conversion of such a reaction and simultaneously reduce the downstream separation cost may include selectively removing hydrogen from the product stream. As can be seen in Formula 1, the removal of hydrogen pushes the equilibrium to the right.

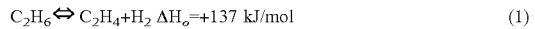

$$C_2H_6 \Leftrightarrow C_2H_4 + H_2 \quad \Delta H_o = +137 \text{ kJ/mol} \tag{1}$$

For example, in downstream processes, the product stream may require liquefaction. As such, the reduction of hydrogen in the product stream reduces the volume of gas to be liquefied. Therefore, the complete or partial removal of hydrogen in the product stream reduce the energy requirements for downstream liquefaction processes. Also, the complete or partial removal of hydrogen in in the product stream may subsequently reduce downstream separation costs for separating out the hydrogen.

As such, there are needs for economical methods of producing oxygen carrier materials that may be selective for the combustion of hydrogen. Embodiments of the present disclosure may meet those needs by providing a method of forming a conformal coating, or shell, of an alkali transition metal oxide around a redox-active metal oxide interior portion, or core, via heat treatment. Without the shell, the core may combust both hydrogen and hydrocarbon similar to conventional oxygen carrier materials. The heat treatment may allow the shell material to cover at least a portion of the core material so that some or all of the surface area of the core material that would otherwise be exposed to an outside environment is completely covered by the shell material. As such, it is believed that the heat treatment may allow the shell material may cover at least a portion of the core material, which may have a higher selectively for the combustion of alkanes, alkenes, or alkyl aromatics. The inclusion of a support material may allow for the physical properties of the hydrogen-selective oxygen carrier material to be adjusted. In comparison to embodiments that do not include a support material, the amount of, the type, and the manner in which the support material is incorporated may allow for the solids residence time in the circulating fluidized bed reactor to be adjusted, may allow for the attrition resistance of the hydrogen-selective oxygen carrier material to be modified, may allow for the dispersion of the redox-active transition metal oxide near the surface of hydrogen-selective oxygen carrier material, and may allow for the retention of selectivity towards hydrogen combustion upon attrition.

According to at least one embodiment of the present disclosure, methods of producing hydrogen-selective oxygen carrier materials are provided. The method may include combining one or more core material precursors, one or more shell material precursors, and one or more support materials to from a precursor mixture. The method may also include heat-treating the precursor mixture at a treatment temperature to form the hydrogen-selective oxygen carrier material. The hydrogen-selective oxygen carrier material may have a core, which may include a core material, and a shell, which may include a shell material. The shell material may be in direct contact with at least a majority of an outer surface of the core material. The treatment temperature may be greater than or equal to 100° C. less than the melting point of a shell material. The core material may include a redox-active transition metal oxide, and the shell material may include an alkali transition metal oxide.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete and will fully convey the scope of the subject matter to those skilled in the art.

Figure 1:
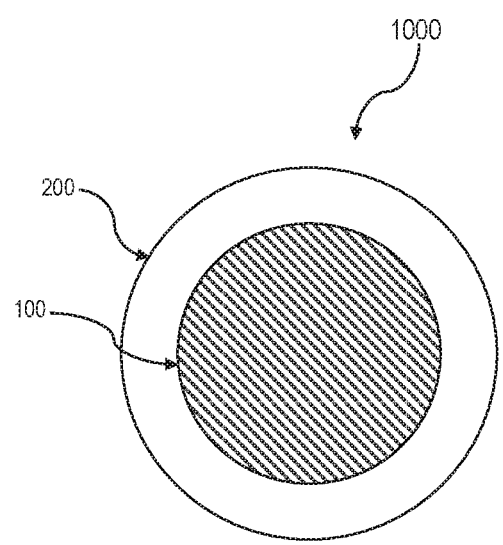
FIG. 1 depicts a cross sectional view of a hydrogen-selective oxygen carrier material having a core material and a shell material, according to one or more embodiments of the present disclosure.

Generally, described in this disclosure are various embodiments of methods of forming hydrogen-selective oxygen carrier materials. As used herein, "hydrogen-selective" refers to the selectivity towards hydrogen combustion. Embodiments of the methods may generally include combining one or more core material precursors and one or more shell material precursors to form a precursor mixture, and heat treating the precursor mixture at a treatment temperature to form the hydrogen-selective oxygen carrier material. The hydrogen-selective oxygen carrier material may comprise a core material (sometimes referred to herein a "core) and a shell material (which may be referred to herein as a "shell). FIG. 1 depicts a cross-section view of embodiments of a hydrogen-selective oxygen carrier material. In FIG. 1, embodiments of the hydrogen-selective oxygen carrier material 1000 may include the core material 100 and the shell material 200.

The shell material may allow the hydrogen-selective oxygen carrier material to be at least partially selective for hydrogen combustion in the presence of hydrocarbons.

Without being bound by theory, it is believed that the shell may act as a selective barrier that prevents the contact between the surface of the core and hydrocarbons. In embodiments, the shell material may allow smaller (relative to the hydrocarbons) hydrogen molecules to permeate through the shell material and react with lattice oxygen on the surface of the core material. As the hydrogen diffuse through the shell material into the core, the hydrogen may be combusted, and water may permeate back through the shell material. Without being bound by theory, it is also believed that the shell material may act to control diffusion of oxygen from the lattice of the core material and may provide selective sites which combust hydrogen more selectively than hydrocarbons. Hydrocarbons, as described herein, may include alkanes, alkenes, or alkyl aromatics. In the absence of the shell material, the core material may have a higher selectively for the combustion of hydrocarbons over hydrogen relative to embodiments that include the shell. It should be understood that a hydrogen-selective material may still react some hydrocarbons, but that the majority of chemical conversion will be of hydrogen in an environment that includes both hydrogen and hydrocarbons. The core material may act as a source of oxygen for a reaction such that, in its absence, there is minimal combustion of either hydrogen or hydrocarbons. Without being bound by theory, in embodiments, some relatively small amount of oxygen from the shell material may combust hydrogen or hydrocarbons.

As stated previously in this disclosure, the removal or partial removal of hydrogen may be beneficial in processes used for the production of light olefins and aromatics like ethylene, propylene, and benzene. Compared to processes that do not combust hydrogen, the presently disclosed hydrogen-selective oxygen carrier materials may allow for the removal of hydrogen from upstream dehydrogenation reactions and may subsequently reduce downstream separation costs. Therefore, the presently-disclosed methods for forming hydrogen-selective oxygen carrier materials may allow for more economical and efficient production of light olefins and aromatics.

According to embodiments of the presently-disclosed methods, to form the precursor mixture, one or more core material precursors and one or more shell material precursors are combined. In some embodiments, the one or more shell material precursors may be combined with the one or more core material precursors in a solution. In further embodiments, the one or more shell material precursors may be combined with the one or more core material precursors via wet impregnation. In such embodiments, the one or more shell material precursors are dissolved in an aqueous solution and then are added to the one or more core material precursors to form the precursor mixture. The aqueous solution may be water, or specifically, deionized water. In other embodiments, the one or more core material precursors and the one or more shell material precursors may be combined by physically mixing the one or more core material precursors, present as a dry powder, with the one or more shell material precursors, present as a dry powder.

The one or more core material precursors may include one or more transition metal oxides. According to one or more embodiments, the core material precursors may be a redox-active transition metal oxide capable of oxygen carrying functionality by which oxygen atoms can be removed and replaced from the solid lattice. The redox-active transition metal oxide includes binary, ternary, or other mixed metal oxides capable of undergoing reduction in the presence of a reducing agent (for example, hydrogen) and oxidation in the presence of oxidizing agent (for example, oxygen or air). In some embodiments the redox-active transition metal oxide may be chosen from $Mn_2O_3$, $Fe_2O_3$, $CO_3O_4$, CuO, (LaSr)$CoO_3$, (LaSr)$MnO_3$, $Mg_6MnO_8$, $MgMnO_3$, $MnO_2$, $Fe_3O_4$, $Mn_3O_4$, and $Cu_2O$. In some embodiments, the one or more core material precursors may be a solid. In specific embodiments, the one or more core material precursors may be a crushed solid, such as powder. As stated previously, the hydrogen-selective oxygen carrier material may comprise a core material, which makes up a core. The core material precursor or precursors lead to the formation of the core material making up the core.

The one or more shell material precursors may include one or more alkali transition metal oxides, which may include one or more alkali elements and transition metals. In some embodiments, alkali elements may include one or more of sodium (Na), lithium (Li), potassium (K), and cesium (Cs). In some embodiments, transition metals may include one or more of tungsten (W) and molybdenum (Mo). As stated previously, the hydrogen-selective oxygen carrier material also comprises a shell material, which makes up a shell. In some embodiments, the shell material may also be redox-active. The shell material precursor or precursors lead to the formation of the shell material making up the shell.

In some embodiments, the precursor mixture may comprise a single core material precursor and a single shell material precursor. In other embodiments, one or more core material precursors are formed prior to combining the one or more core material precursors and the one or more shell material precursors. In other embodiments, one or more shell material precursors are formed prior to combining the one or more core material precursors and the one or more shell material precursors.

According to embodiments, once the precursor mixture has been formed, it may be heat treated at a treatment temperature to form the hydrogen-selective oxygen carrier material. Without being bound by theory, it is believed that the heat treatment may cause the shell material to cover the core material, which may therefore allow the oxygen carrier material to become at least partially selective for hydrogen combustion in the presence of hydrocarbons. The shell material may cover at least a portion of the core material so that the entire surface area or a portion of the surface area of the core material that would otherwise be exposed to an outside environment is covered or surrounded by the shell material. In some embodiments, the core may be completely covered or surrounded, but the shell may not be uniform. In other embodiments, the shell may be conformal or uniform. As such, it is believed that in the absence of the heat treatment, at least a portion of the core material, which may have a relatively higher selectively for hydrocarbons, may be exposed. As a result of this exposure, both the hydrocarbons and hydrogen may be combusted.

In some embodiments, the treatment temperature may be at a degree sufficient to cause the shell material to cover the core material. In some embodiments, the treatment temperature may be greater than or equal to about 100° C. less than the melting point of the shell material. In other embodiments, the treatment temperature may be greater than or equal to about 50° C., about 25° C., about 10° C., or about 5° C. less than the melting point of the shell material. In further embodiments, the treatment temperature may be about equal to (e.g., within 5° C., 10° C., 20° C., or 30° C. of) the melting point of the shell material.

In some embodiments, the treatment temperature may be at a degree sufficient to prevent the core material from becoming exposed or destroyed. In some embodiments, the core material may become exposed if the treatment temperature is higher than the melting point of the core material, which may prevent the core material from being surrounded or covered by the shell material. In such embodiments, the treatment temperature may cause the core material to melt and mix with the shell material. The mixture of core material and shell material may then form an oxygen carrier material with a surface that includes at least some core material. As stated previously in this disclosure, the core material be non-selective to hydrogen combustion, which would therefore be exposed. As a result of this exposure, both the hydrocarbons and hydrogen may be combusted. In some embodiments, the treatment temperature may be less than the melting point of the core material. In other embodiments, the treatment temperature may be at least about 25° C., about 50° C., or about 100° C. less than less than the melting point of the core material.

During heat treatment, in some embodiments, two or more shell material precursors in the precursor mixture may react to form the shell material. As explained previously in this disclosure, the shell material may act as a selective barrier that prevents the contact between the surface of the core and hydrocarbons. In embodiments, the shell material may allow smaller (relative to the hydrocarbons) hydrogen molecules to permeate through the shell material and react with lattice oxygen on the surface of the core material. As the hydrogen diffuse through the shell material in the core, the hydrogen may be combusted, and water may permeate back through the shell material. In some embodiments, the shell material may act to control diffusion of oxygen from the lattice of the core material and may provide selective sites which combust hydrogen more selectively than hydrocarbons.

In some embodiments, the precursor mixture is heat treated for a time period long enough to impart hydrogen selectivity onto the core material, which is a time period long enough for the shell material to completely cover the core material. In some embodiments, the heat treatment time period may be from about 0.5 hours to about 12 hours. In other embodiments, the heat treatment time period may be from about 0.5 hours to about 10 hours, from about 0.5 hours to about 8 hours, from about 0.5 hours to about 5 hours, from about 1 hour to about 12 hours, from about 1 hour to about 10 hours, from about 1 hour to about 8 hours, or from about 1 hour to about 5 hours.

According to one or more embodiments, the methods of forming hydrogen-selective oxygen carrier materials may include additional drying steps. In some embodiments, the method may include drying the precursor mixture prior to heat treating the precursor mixture.

Once formed, the hydrogen-selective oxygen carrier material may include a core material, which includes a redox-active transition metal oxide. The redox-active transition metal oxide may include binary, ternary, or other mixed metal oxides capable of undergoing reduction in the presence of a reducing agent (for example, hydrogen) and oxidation in the presence of oxidizing agent (for example, oxygen or air). In some embodiments the redox-active transition metal oxide may be chosen from $Mn_2O_3$, $Fe_2O_3$, $Co_3O_4$, $CuO$, $(LaSr)CoO_3$, $(LaSr)MnO_3$, $Mg_6MnO_8$, $MgMnO_3$, $MnO_2$, $Fe_3O_4$, $Mn_3O_4$, $Cu_2O$, and combinations thereof.

The formed hydrogen-selective oxygen carrier material may include a shell material, which imparts selectivity towards hydrogen combustion. The shell material includes one or more alkali transition metal oxides, which may include one or more alkali elements and transition metals. In some embodiments, alkali elements may include one or more of sodium (Na), lithium (Li), potassium (K), and cesium (Cs). In some embodiments, transition metals may include one or more of tungsten (W) and molybdenum (Mo). In further embodiments, the one or more alkali transition metal oxides are chosen from $Na_2WO_4$, $K_2MoO_4$, $Na_2MoO_4$, $K_2WO_4$, $Li_2WO_4$, $Cs_2WO_4$, $Cs_2MoO_4$, $Li_2MoO_4$, and combinations thereof.

In some embodiments, the formed hydrogen-selective oxygen carrier material may have a shell, where at least a portion of or the entire shell material has a thickness of at least 1 crystalline unit cell. A crystalline cell unit is the simplest repeating unit in a crystal. In other embodiments the shell material may have a thickness of from about 1 crystalline unit cell to about 5 crystalline unit cells. In further embodiments, the shell material may have a thickness of from about 1 crystalline unit cell to about 2 crystalline unit cells or from about 2 crystalline unit cells to about 5 crystalline unit cells. In some embodiments, the shell material has a thickness of from about 1 nm to about 50 nm. In other embodiments, the shell material may have a thickness of from about 1 to about 25 nm, from about 5 nm to about 50 nm, from about 5 nm to about 25 nm, from about 5 nm to about 10 nm, from about 10 nm to about 50 nm, from about 10 nm to about 25 nm, or from about 25 nm to about 50 nm.

According to one or more embodiments, the shell material may be in direct contact with at least a majority of the outer surface of the core material. It should be understood that, in some embodiments, substantially the entire outer surface (e.g., greater than 99.5%) of the core material may be covered by the shell material. In additional embodiments, only a portion of the outer surface of the core material is in direct contact with the shell material. For example, the shell material may be in contact with at least 50%, at least 60%, at least 70%, at least 80%, at least 90%, at least 95%, at least 96%, at least 97%, at least 98%, or even at least 99% of the outer surface of the core material. The portions of the core material which are not directly contacted by the shell material may form an interface with surrounding air, or may be in direct contact with other materials such as, for example, a support or another shell layer, as is described herein.

Without being bound by theory, the amount of shell material may be related to the surface area of the core material. In some embodiments, the amount of core material may be related to the volume of the core material. In further embodiments, the ratio, by weight, of the core material to the shell material may be a function of particle size of the core material. In some embodiments the ratio of the core material to the shell material in the formed hydrogen-selective oxygen may be 1:1 by weight. In other embodiments, the ratio of the core material to the shell material may be from about 1 to about 45:1 or from about 1 to about 10:1 by weight.

In further embodiments, the formed hydrogen-selective oxygen carrier material may further include a secondary coating material. The secondary coating material may include one or more alkali transition metal oxides. In embodiments, the material composition of shell material may be different from the material composition of the secondary coating material. In such embodiments, the secondary coating material may be coated onto the surface of the hydrogen-selective oxygen carrier material according to coating processes known in the art.

In some embodiments, the formed hydrogen-selective oxygen carrier material further includes a support material. In such embodiments, the alkali transition metal oxides, the redox-active metal oxides, or both may be supported on the support material. The support material may include one or more inorganic bulk metal oxides, such as sili silica ($SiO_2$), alumina ($Al_2O_3$), silica and alumina, zirconia ($ZrO_2$), titania ($TiO_2$), other metal oxides, or combinations of metal oxides. In some embodiments, the support material may include a microporous material, such as ZSM-5 zeolite. In embodiments, the porosity of at least a portion of the support material may have a pore size of from about 0.1 nm to about 100 nm, from about 0.1 nm to about 75 nm, from about 0.1 nm to about 50 nm, from about 0.1 nm to about 25 nm, from about 0.1 nm to about 1 nm, from about 1 nm to about 100 nm, from about 1 nm to about 75 nm, from about 1 nm to about 50 nm, from about 1 nm to about 25 nm, from about 25 nm to about 100 nm, from about 25 nm to about 75 nm, from about 25 nm to about 50 nm, from about 50 nm to about 100 nm, from about 50 nm to about 75 nm, or from about 75 nm to about 100 nm.

The alkali transition metal oxides, the redox-active metal oxides, or both may be supported on the surface of the support or incorporated into the support material. In further embodiments, at least a portion of the surface of the core material is in direct contact with the support material. In further embodiments, the shell material is in direct contact with at least some portions of the surface of the core material that are not in contact with the support material. In some embodiments, the core material is in direct contact with and completely surrounds the support material, and the shell material is in direct contact with an entire outer surface of the core material. In other embodiments, the shell material may completely or partially cover both the support and the core material so that the entire surface area of the core material and the support that would otherwise be exposed to an outside environment is completely covered. In such embodiments, the core material precursors, the shell material precursors, or both, may be impregnated onto the support. In some embodiments, the support material may be impregnated specifically by wet impregnation.

In further embodiments that include a support material, the support material and the shell material may be in contact with the core material so that some or the entire surface area of the core material that would otherwise be exposed to an outside environment is covered. In further embodiments the core material may be partially or completely covered, but portions of the core material may contact only the support material or only the shell material. In further embodiments, the shell material may partially or completely cover both the support and the core material so that the entire surface area of the core material and the support that would otherwise be exposed to an outside environment is completely covered. In other embodiments at least a portion of either the support material or the shell material may not be in direct contact with the core material. As a result, the shell material, the support, or both may act as a barrier that prevents the contact between the surface of all or some of the core and hydrocarbons.

Figure 2A:
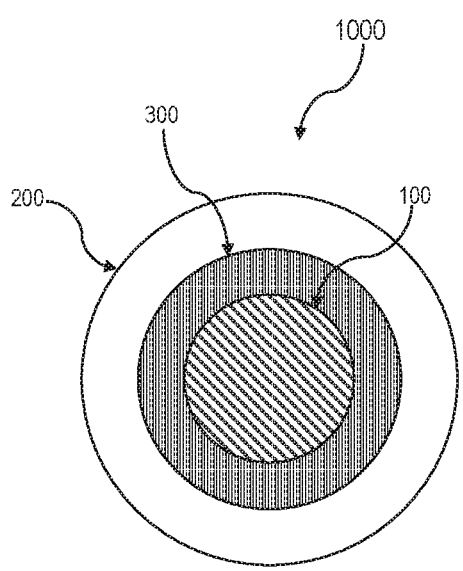
FIG. 2A depicts a cross sectional view of a hydrogen-selective oxygen carrier material having a core material, a shell material, and a support material, according to one or more embodiments of the present disclosure.
Figure 2B:
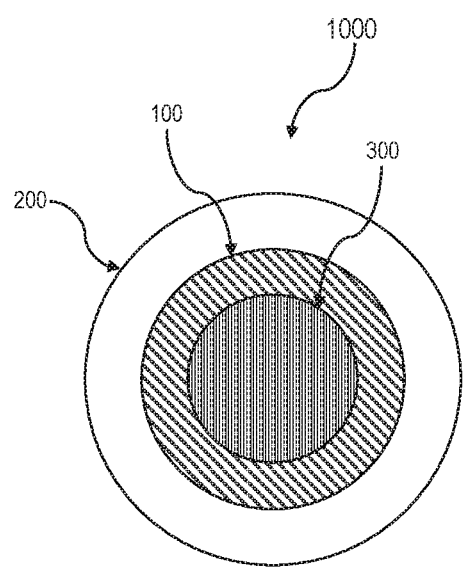
FIG. 2B depicts a cross sectional view of a hydrogen-selective oxygen carrier material having a core material, a shell material, and a support material, according to one or more embodiments of the present disclosure.
Figure 3A:
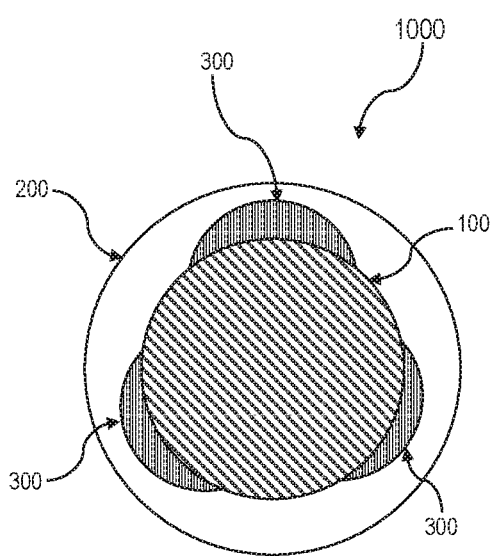
FIG. 3A depicts a cross sectional view of a hydrogen-selective oxygen carrier material having a core material, a shell material, and a support material, according to one or more embodiments of the present disclosure.
Figure 3B:
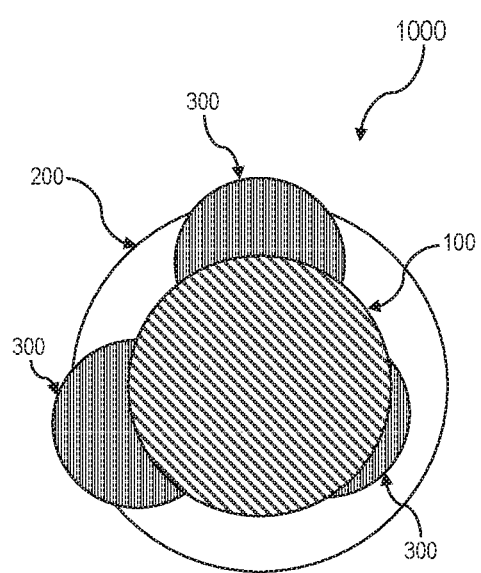
FIG. 3B depicts a cross sectional view of a hydrogen-selective oxygen carrier material having a core material, a shell material, and a support material, according to one or more embodiments of the present disclosure.
Figure 4A:
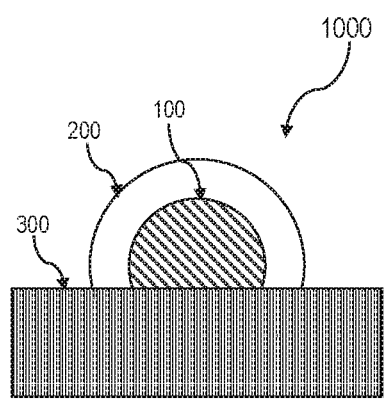
FIG. 4A depicts a cross sectional view of a hydrogen-selective oxygen carrier material having a core material, a shell material, and a support material, according to one or more embodiments of the present disclosure.
Figure 4B:
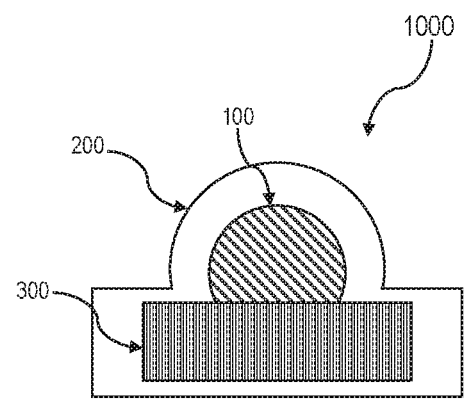
FIG. 4B depicts a cross sectional view of a hydrogen-selective oxygen carrier material having a core material, a shell material, and a support material, according to one or more embodiments of the present disclosure.

FIGS. 2A-4B depict a cross-section view of embodiments of a hydrogen-selective oxygen carrier material including a support material. In FIGS. 2A-4A, embodiments of the hydrogen-selective oxygen carrier material 1000 may include the core material 100, the shell material 200, and the support material 300. Referring now to FIG. 2A, in some embodiments, the hydrogen-selective oxygen carrier material 1000 may include the core material 100, which may be surrounded by the support material 300, which may be surrounded by the shell material 200. Referring now to FIG. 2B, in some embodiments, the hydrogen-selective oxygen carrier material 1000 may include the support material 300, which may be surrounded by the core material 100, which may be surrounded by the shell material 200. Referring now to FIG. 3A, in some embodiments of the hydrogen-selective carrier material 1000, portions of the core material 100 may be contacted by the support material 300, and the shell material 200 may surround both the core material 100 and the support material 300. Referring now to FIG. 3B, in some embodiments of the hydrogen-selective carrier material 1000, portions of the core material 100 may be contacted by the support material, and the shell material 200 and the support material 300 may together entirely surround the core material 100 so that some or the entire surface area of the core material that would otherwise be exposed to an outside environment is covered. Referring now to FIG. 4A, in some embodiments of the hydrogen-selective carrier material 1000, portions of the core material 100 may be contacted by the support material, and the shell material 200 and the support material 300 may together entirely surround the core material 100 so that some or the entire surface area of the core material that would otherwise be exposed to an outside environment is covered. Referring now to FIG. 4B, in some embodiments of the hydrogen-selective carrier material 1000, portions of the core material 100 may be contacted by the support material 300, and the shell material 200 may surround both the core material 100 and the support material 300.

Without being bound by theory, the inclusion of the support material may allow for the physical properties of the hydrogen-selective oxygen carrier material to be adjusted. It is contemplated that the amount of and type of support material may increase or decrease the particle density of the hydrogen-selective oxygen carrier material, which may adjust the solids residence time in the circulating fluidized bed reactor. It is contemplated that the attrition resistance of the support material may increase or decrease the attrition resistance of the hydrogen-selective oxygen carrier material. The mechanical strength of the support material may increase the attrition resistance of the hydrogen-selective oxygen carrier material. It is contemplated that the support material may be utilized to disperse the redox-active transition metal oxide near the surface of hydrogen-selective oxygen carrier material. For example, when the redox-active transition metal oxide completely surrounds the support material, the diffusion length needed for the lattice oxygen atoms to react with hydrogen may be shorter in comparison to embodiments that do not include a support material, which may improve hydrogen combustion activity. It is contemplated that the hydrogen-selective oxygen carrier material including a support material may retain selectivity towards hydrogen combustion upon attrition in comparison to embodiments that do not include a support material. For example, the support material may allow for the hydrogen-selective oxygen carrier material to retain an additional reservoir of the shell material that can recoat the exposed redox-active transition metal oxide surface due to attrition.

According to at least one embodiment of the present disclosure, a method for converting hydrocarbons using hydrogen-selective oxygen carrier materials is provided. Embodiments of the method may include contacting hydrogen with embodiments of the hydrogen-selective oxygen carrier material described herein. In further embodiments, the method may include dehydrogenating one or more alkanes and alkyl aromatics to produce a dehydrogenated product and hydrogen. The hydrogen-selective oxygen carrier material may be selective for combusting the hydrogen compared to combusting hydrocarbons. In some embodiments, the one or more alkanes may be dehydrogenated by thermal cracking. In some embodiments, the one or more alkanes may be dehydrogenated by contact with a dehydrogenation catalyst. Further embodiments may include a reactor in which a paraffin is converted to a olefin and the resulting hydrogen reacts with the hydrogen-selective oxygen carrier material to produce water and a reduced transition metal in the hydrogen-selective oxygen carrier material. In further embodiments, the method may include regenerating the reduced hydrogen-selective oxygen carrier material. In further embodiments, the reduced hydrogen-selective oxygen carrier material may be reoxidized in air.

According to additional embodiments, it is contemplated that the presently-described hydrogen-selective oxygen carrier materials may be utilized in a wide variety of chemical processes, which utilize oxygen carrier materials. For example, the hydrogen-selective oxygen carrier materials described herein may be utilized in chemical looping processes (for example, for dehydrogenation of alkanes or alkyl aromatics), processes for the removal of hydrogen from a product stream containing hydrogen and hydrocarbons (for example, alkanes or alkenes), and processes that require in-situ generation of water at temperatures greater than 300° C., or more specifically, at temperatures from 300° C. to 900° C.

EXAMPLES

The following examples illustrate features of the present disclosure but are not intended to limit the scope of the disclosure. The following experiments compared the performance of comparative oxygen carrier materials with examples of the presently-described hydrogen-selective oxygen carrier materials.

Comparative Example A

For Comparative Example A, PyroSil fused silica chips (0.5-1 mm) were used as received.

Comparative Example B

To prepare Comparative Example B, 5 grams (g) of $Fe_2O_3$ powder were calcined in air at 900° C. for 8 hours.

Comparative Example C

To prepare comparative Example C, 4.49 g of magnesium oxide powder (MgO, Alfa Aesar #12287) was impregnated with 4.66 g of manganese nitrate ($Mn(NO_3)_2 \cdot 4H_2O$, Sigma Aldrich #63547) by dissolving manganese nitrate in 5.8 ml of deionized water. The mixture was dried at 80° C. overnight and calcined at 900° C. for 8 hours.

Example 1

To prepare Example 1, 0.69 g of a shell precursor, sodium tungstate ($Na_2WO_4 \cdot 2H_2O$, Sigma Aldrich #223336), was dissolved in 5 mL of deionized water and added to 5 g of a core precursor, cobalt oxide powder ($Co_3O_4$, Alfa Aesar #A16121). The mixture was then dried overnight at 80° C. and then calcined in air at 900° C. for a period of 8 hrs. Example 1 provides an example of a hydrogen-selective oxygen carrier material with a $Co_3O_4$ core and a shell that includes Na and W.

Example 2

To prepare Example 2, 11.04 g of a shell precursor, sodium tungstate ($Na_2WO_4 \cdot 2H_2O$, Sigma Aldrich #223336), was dissolved in 35 mL of deionized water and added to 80 g of a shell precursor, iron oxide powder ($Fe_2O_3$). The mixture was then dried overnight at 80° C. and then calcined in air at 900° C. for a period of 8 hours. Example 2 provides an example of a hydrogen-selective oxygen carrier material with a $Fe_2O_3$ core and a shell that includes Na and W.

Example 3

To prepare Example 3, 0.27 g of potassium tungstate ($K_2WO_4$) was dissolved in 0.5 mL of deionized water and added to 2 g of iron oxide ($Fe_2O_3$) powder. The mixture was then dried overnight under ambient conditions and then calcined at 950° C. for 8 hours. Example 3 provides an example of a hydrogen-selective oxygen carrier material with a $Fe_2O_3$ core and a shell that includes K and W.

Example 4

To prepare Example 4, 0.67 g of a shell precursor, sodium nitrate ($NaNO_3$, Sigma Aldrich #221341), and 0.55 g of a shell precursor, ammonium molybdate (Sigma Aldrich #277908), were dissolved in 3 mL of water and added to 4 g of a core precursor, iron oxide powder ($Fe_2O_3$). The mixture was then dried overnight under ambient conditions and then calcined in air at 950° C. for a period of 8 hours. Example 4 provides an example of a hydrogen-selective oxygen carrier material with a $Fe_2O_3$ core and a shell that includes Na and Mo.

Example 5

To prepare Example 5, 65.24 g of a core precursor, manganese nitrate ($Mn(NO_3)_2 \cdot 4H_2O$, Sigma Aldrich #63547) and 11.60 g of a shell precursor, sodium tungstate ($Na_2WO_4 \cdot 2H_2O$, Sigma Aldrich #223336) was dissolved in 75 mL of deionized water and added to 62.86 g of a core precursor, magnesium oxide powder (MgO, Alfa Aesar #12287). The mixture was then dried under ambient conditions overnight and then calcined at 900° C. for 8 hours. Example 5 provides an example of a hydrogen-selective oxygen carrier material with an $Mg_6MnO_8$ core and a shell that includes Na and W.

Example 6

To prepare Example 6, 4.66 g of a core precursor, manganese nitrate ($Mn(NO_3)_2 \cdot 4H_2O$, Sigma Aldrich #63547), and 0.85 g of a shell precursor, potassium tungstate ($K_2WO_4$, Alfa Aesar #14031), were dissolved in 5 mL of deionized water and added to 4.5 g of a core precursor, magnesium oxide powder (MgO, Alfa Aesar #12287). The mixture was then dried overnight under ambient conditions and then calcined at 900° C. for 8 hrs. Example 6 provides an example of a hydrogen-selective oxygen carrier material with a $Mg_6MnO_8$ core and a shell that includes K and W.

Example 7

To prepare Example 7, 0.55 g of a shell precursor, ammonium molybdate (($NH_4)_2MoO_4$, Sigma Aldrich #277908) and 0.67 g of a shell precursor sodium nitrate ($NaNO_3$, Sigma Aldrich #221341) were dissolved in 4 mL of deionized water and added to 4 g of a pre-synthesized metal oxide magnesium manganese oxide ($Mg_6MnO_8$). The mixture was then dried overnight under ambient conditions and then calcined at 950° C. for 8 hours. The pre-synthesized magnesium manganese oxide can be prepared by two methods. The first method includes wet impregnating magnesium oxide (MgO, Alfa Aesar, #12287), with stoichiometric amount of manganese nitrate ($Mn(NO_3)_2 \cdot 4H_2O$, Sigma Aldrich #63547) in deionized water, drying the mixture overnight, and calcining the dried powder in the temperature range of 400° C. to 950° C. for 2 hours to 10 hours. The second method includes a sol-gel method that uses magnesium nitrate, manganese nitrate, ethylene glycol and citric acid where 23.4 g of magnesium nitrate are dissolved in 3.81 g of manganese nitrate in deionized water. Then 61.36 g of citric acid are added the mixture and heated to 50° C. to 60° C. for 10 minutes to 30 minutes. Then, 39.65 g of ethylene glycol are added to the mixture, heated at 85° C. to 95° C. to produce a gel, dried at 135° C., and calcined at 400° C. to 950° C. for 4 hours to 12 hours. Example 7 provides an example of a hydrogen-selective oxygen carrier material with an $Mg_6MnO_8$ core and a shell that includes Na and Mo.

Example 8

To prepare Example 8, 155.78 g of a core precursor, manganese nitrate ($Mn(NO_3)_2 \cdot 4H_2O$, Sigma Aldrich #63547), and 10.80 g of a shell precursor, sodium tungstate ($Na_2WO_4 \cdot 2H_2O$, Sigma Aldrich #223336), were dissolved in 100 mL of deionized water and added to 25 g of a core precursor, magnesium oxide powder (MgO, Alfa Aesar #12287). The mixture was then dried overnight under ambient conditions and then calcined at 900° C. for 8 hours. Example 8 provides an example of a hydrogen-selective oxygen carrier material with an $MgMnO_3$ core and a shell that includes Na and W.

Example 9

To prepare Example 9, 0.69 g of a shell precursor, sodium tungstate ($Na_2WO_4 \cdot 2H_2O$, Sigma Aldrich #223336), were dissolved 6 mL of deionized water and added to 5 g of a core precursor, manganese oxide powder ($MnO_2$, Alfa Aesar #14340). The mixture was then dried overnight at 80° C. and then calcined at 900° C. for a period of 8 hours. Example 9 provides an example of a hydrogen-selective oxygen carrier material with a $MnO_2$ core and a shell that includes Na and W.

Example 10

To prepare Example 10, 1.6 g of a shell precursor, sodium molybdate ($Na_2MoO_4 \cdot 2H_2O$, Sigma Aldrich #331058), was dissolved in 1 mL of deionized water and added to 4 g of a core precursor iron oxide powder ($Fe_2O_3$). The mixture was then dried overnight under ambient conditions and then calcined in air at 950° C. for a period of 8 hours. Example 10 provides an example of a hydrogen-selective oxygen carrier material with a $Fe_2O_3$ core and a shell that includes Na and Mo.

Example 11

To prepare Example 11, 4.66 g of manganese nitrate ($Mn(NO_3)_2 \cdot 4H_2O$, Sigma Aldrich #63547) and 1.2 g of sodium molybdate ($Na_2MoO_4 \cdot 2H_2O$, Sigma Aldrich #331058) were dissolved in 5 mL of deionized water and added to 4.5 g of magnesium oxide powder (MgO, Alfa Aesar #12287). The mixture was then dried overnight under ambient conditions and then calcined at 950° C. for 8 hours. Example 11 provides an example of a hydrogen-selective oxygen carrier material with an $Mg_6MnO_8$ core and a shell that includes Na and Mo.

Example 12

To prepare Example 12, 0.4 g of sodium tungstate dihydrate ($Na_2WO_4 \cdot 2H_2O$, Sigma Aldrich #223336) was dissolved in 3 mL of deionized water and added to 3 g of pre-synthesized metal oxide magnesium manganese oxide ($Mg_6MnO_8$). The mixture was dried overnight under ambient conditions and then calcined at 950° C. for 30 minutes. The pre-synthesized metal oxide magnesium manganese oxide may be prepared by either of the two methods provided in Example 7. Example 12 provides an example of a hydrogen-selective oxygen carrier material with an $Mg_6MnO_8$ core and a shell that includes Na and W.

Example 13

To prepare Example 13, 0.4 g of sodium tungstate ($Na_2WO_4 \cdot 2H_2O$, Sigma Aldrich #223336) was dissolved in 3 mL of deionized water and added to 3 g of iron oxide ($Fe_2O_3$) powder, The mixture was then dried overnight under ambient conditions and then calcined at 950° C. for 30 minutes. Example 13 provides an example of a hydrogen-selective oxygen carrier material with an $Fe_2O_3$ core and a shell that includes Na and W.

Example 14

To prepare Example 14, 0.27 g of shell precursor, sodium tungstate ($Na_2WO_4 \cdot 2H_2O$, Sigma Aldrich #223336) was dissolved in 2.5 mL of deionized water and added to 2.00 g of core precursor lanthanum strontium manganese oxide (($LaSr)MnO_3$, Sigma Aldrich #704296). The mixture was then dried overnight under ambient conditions and calcined at calcined at 900° C. for 8 hours. Example 14 provides an example of a hydrogen-selective oxygen carrier material with a (($LaSr)MnO_3$ core and a shell that includes Na and W.

Example 15

To prepare Example 15, 4.66 g of a core precursor, manganese nitrate ($Mn(NO_3)_2 \cdot 4H_2O$, Sigma Aldrich #63547), and 0.17 g of a shell precursor, sodium tungstate ($Na_2WO_4 \cdot 2H_2O$, Sigma Aldrich #223336), were dissolved in 5 mL of deionized water and added to 4.5 g of a core precursor, magnesium oxide powder (MgO, Alfa Aesar #12287). The mixture was then dried overnight under ambient conditions and then calcined at 900° C. for 8 hrs. Example 15 provides an example of a hydrogen-selective oxygen carrier material with a $Mg_6MnO_8$ core and a shell that includes Na and W.

Example 16

To prepare Example 16, 0.055 g of shell precursor, sodium tungstate ($Na_2WO_4 \cdot 2H_2O$, Sigma Aldrich #223336) was dissolved in 4.8 ml of deionized water and added to 5.00 g of pre-synthesized magnesium manganese oxide ($Mg_6MnO_8$) as described in Example 7. The mixture was then dried overnight at 80° C. and calcined at 900° C. for 8 hours. Example 16 provides an example of a hydrogen-selective oxygen carrier material with a $Mg_6MnO_8$ core and a shell that includes Na and W.

Example 17

To prepare Example 17, 5.0 g of $Fe_2O_3$(Alfa Aesar #12375) was mixed with 5.0 g of alpha alumina (Alfa Aesar #42572) and milled in a planetary ball mill at 500 rpm for 10 min. Post ball milling the powder mixture was impregnated with 1.45 g of $K_2WO_4$ (Alfa Aesar #14031) by dissolving it in 2.5 ml of deionized water. The impregnated material was then dried overnight under ambient conditions and calcined at 950° C. for 10 hrs.

Example 18

To prepare Example 18, 3.0 g of $Fe_2O_3$(Alfa Aesar #12375) were mixed with 3.0 g of gamma alumina (Alfa Aesar #39812) and milled in a planetary ball mill at 500 rpm for 10 min. Post ball milling the powder mixture was impregnated with 0.83 g of $K_2WO_4$ (Alfa Aesar #14031) by dissolving it in 1.5 ml of deionized water. The impregnated material was then dried overnight under ambient conditions and calcined at 950° C. for 10 hrs.

Example 19

To prepare Example 19, 5.0 g of $Fe_2O_3$(Alfa Aesar #12375) were mixed with 5.0 g of aluminum hydroxide (Sigma Aldrich #11037) and milled in a planetary ball mill at 500 rpm for 10 min. Post ball milling the powder mixture was impregnated with 1.40 g of $K_2WO_4$ (Alfa Aesar #14031) by dissolving it in 2.5 ml of deionized water. The impregnated material was then dried overnight under ambient conditions and calcined at 950° C. for 10 hrs.

Example 20

To prepare Example 20, 5.0 g of $Fe_2O_3$(Alfa Aesar #12375) were mixed with 5.0 g of alpha alumina (Alfa Aesar #42572) and milled in a planetary ball mill at 500 rpm for 10 min. Post ball milling the powder mixture was calcined at 950° C. for 10 hrs. The calcined material was then impregnated with 1.4 g of $K_2WO_4$ (Alfa Aesar #14031) by dissolving it in 1.5 ml of deionized water. The impregnated material was then dried overnight under ambient conditions and calcined at 950° C. for 8 hrs.

Example 21

To prepare Example 21, 3.0 g of $Fe_2O_3$(Alfa Aesar #12375) were mixed with 3.0 g of gamma alumina (Alfa Aesar #39812) and milled in a planetary ball mill at 500 rpm for 10 min. Post ball milling the powder mixture was calcined at 950° C. for 10 hrs. The calcined material was then impregnated with 0.84 g of $K_2WO_4$ (Alfa Aesar #14031) by dissolving it in 1.5 ml of deionized water. The impregnated material was then dried overnight under ambient conditions and calcined at 950° C. for 8 hrs.

Example 22

To prepare Example 22, 5.0 g of $Fe_2O_3$(Alfa Aesar #12375) were mixed with 5.0 g of aluminum hydroxide (Sigma Aldrich #11037) and milled in a planetary ball mill at 500 rpm for 10 min. Post ball milling the powder mixture was calcined at 950° C. for 10 hrs. The calcined material was then impregnated with 1.4 g of $K_2WO_4$ (Alfa Aesar #14031) by dissolving it in 1.5 ml of deionized water. The impregnated material was then dried overnight under ambient conditions and calcined at 950° C. for 8 hrs.

Example 23

To prepare Example 23, 6.0 g of $Fe_2O_3$(Alfa Aesar #12375) were impregnated with 0.84 g of $K_2WO_4$ (Alfa Aesar #14031) by dissolving it in 1.5 ml of deionized water. The impregnated material was then dried overnight under ambient conditions and calcined at 950° C. for 8 hrs.

Analysis of Examples 1-16 and Comparative Examples A-C at 700° C., 750° C., 800° C., and 850° C.

To test the performance of Examples 1-16 in comparison to Comparative Examples A-C, a fixed bed reactor setup was used. To perform the experiment, 150 milligrams (mg) samples of Examples 1-16 and Comparative Examples A-C were each loaded into a 4 mm ID quartz reactor. The fixed bed reactor was then operated at 700° C., 750° C., 800° C., and 850° C., respectively, for each sample, with a feed flow of 10 standard cubic centimeters per minute (sccm) comprising 50 vol. % ethane and 50 vol. % helium. For each Run, the composition of the product stream composition was measured by Gas Chromatography 40 seconds after the start of the feed flow.

Table 1 provides the results for the reactor operating at 700° C.; Table 2 provides the results for the reactor operating at 750° C.; Table 3 provides the results for the reactor operating at 800° C.; and Table 4 provides the results for the reactor operating at 850° C.

TABLE 1

| Results for a reactor operating at 700° C. | | | | | | | | | | |
|---|---|---|---|---|---|---|---|---|---|---|
| | Ex. A | Ex. B | Ex. C | Ex. 1 | Ex. 2 | Ex. 3 | Ex. 4 | Ex. 5 | Ex. 6 | Ex. 7 |
| Acetylene | 0 | 0 | 0.018 | 0 | 0 | 0 | 0 | 0 | 0 | 0 |
| C3 | 0.006 | 0.002 | 0.007 | 0.007 | 0 | 0 | 0.005 | 0 | 0.006 | 0.006 |
| C4 | 0.006 | 0.003 | 0.022 | 0.01 | 0.002 | 0.001 | 0.002 | 0.002 | 0.003 | 0.006 |
| C5 | 0 | 0 | 0 | 0 | 0 | 0 | 0 | 0 | 0 | 0 |
| C6 | 0 | 0 | 0 | 0 | 0 | 0 | 0 | 0 | 0 | 0 |
| CO | 0 | 0 | 0 | 0 | 0 | 0 | 0 | 0 | 0 | 0 |
| CO2 | 0.042 | 15.809 | 17.415 | 0.022 | 0.008 | 0.022 | 0.026 | 0.011 | 0.007 | 0.09 |
| Ethane | 43.99 | 21.003 | 15.848 | 43.807 | 45.843 | 45.996 | 45.21 | 46.135 | 44.646 | 43.906 |
| Ethylene | 2.031 | 2.215 | 5.306 | 2.059 | 0.919 | 0.679 | 1.126 | 0.901 | 1.567 | 1.831 |
| Helium | 50.134 | 33.464 | 32.809 | 49.567 | 51.497 | 51.45 | 49.848 | 50.894 | 50.652 | 50.508 |
| Hydrogen | 2.009 | 0.121 | 0.183 | 0.249 | 0.159 | 0.097 | 0.498 | 0.476 | 0.808 | 0.253 |
| Methane | 0.068 | 0.114 | 0.763 | 0.046 | 0 | 0 | 0.069 | 0 | 0.057 | 0.052 |
| Oxygen | 0.059 | 0.068 | 0.05 | 0.061 | 0.066 | 0.077 | 0.072 | 0.064 | 0.075 | 0.063 |

TABLE 1-continued

Results for a reactor operating at 700° C.

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Acetylene | 0 | 0 | 0 | 0 | 0 | 0 | 0 | 0 | 0 |
| C3 | 0.005 | 0.005 | 0 | 0.006 | 0 | 0.004 | 0.006 | 0.005 | 0.008 |
| C4 | 0.003 | 0.005 | 0 | 0.007 | 0.002 | 0.003 | 0.001 | 0.004 | 0.013 |
| C5 | 0 | 0 | 0 | 0 | 0 | 0 | 0 | 0 | 0 |
| C6 | 0 | 0 | 0 | 0 | 0 | 0 | 0 | 0 | 0 |
| CO | 0 | 0 | 0 | 0 | 0 | 0 | 0 | 0 | 0 |
| $CO_2$ | 0.031 | 0.026 | 0.003 | 0.125 | 0.005 | 0.067 | 0.184 | 0.025 | 0.524 |
| Ethane | 45.19 | 44.568 | 46.136 | 43.576 | 45.41 | 45.437 | 45.065 | 44.59 | 41.739 |
| Ethylene | 1.231 | 1.5 | 0.23 | 2.027 | 1.069 | 1.349 | 1.839 | 1.734 | 2.875 |
| Helium | 51.315 | 49.795 | 50.648 | 50.432 | 50.263 | 49.442 | 49.62 | 49.524 | 50.521 |
| Hydrogen | 0.876 | 0.337 | 0.179 | 0.265 | 0.462 | 0.247 | 1.301 | 0.814 | 0.884 |
| Methane | 0.047 | 0.03 | 0 | 0.079 | 0 | 0.074 | 0.051 | 0.049 | 0.083 |
| Oxygen | 0.067 | 0.075 | 0.053 | 0.076 | 0.067 | 0.092 | 0.071 | 0.075 | 0.067 |

TABLE 2

Results for a reactor operating at 750° C.

|  | Ex. A | Ex. B | Ex. C | Ex. 1 | Ex. 2 | Ex. 3 | Ex. 4 | Ex. 5 | Ex. 6 | Ex. 7 |
|---|---|---|---|---|---|---|---|---|---|---|
| Acetylene | 0 | 0 | 0.038 | 0 | 0 | 0 | 0 | 0 | 0 | 0 |
| C3 | 0.059 | 0.004 | 0.01 | 0.06 | 0.025 | 0.019 | 0.039 | 0.023 | 0.044 | 0.046 |
| C4 | 0.044 | 0.006 | 0.015 | 0.048 | 0.024 | 0.017 | 0.021 | 0.019 | 0.021 | 0.034 |
| C5 | 0 | 0 | 0 | 0 | 0 | 0 | 0 | 0 | 0 | 0 |
| C6 | 0.001 | 0 | 0 | 0.002 | 0 | 0 | 0.001 | 0 | 0.001 | 0.002 |
| CO | 0 | 0 | 0.226 | 0 | 0 | 0 | 0 | 0 | 0 | 0 |
| $CO_2$ | 0.027 | 23.743 | 18.504 | 0.149 | 0.045 | 0.162 | 0.081 | 0.04 | 0.09 | 0.529 |
| Ethane | 31.159 | 13.62 | 12.308 | 31.126 | 38.134 | 39.31 | 35.619 | 39.018 | 32.998 | 31.913 |
| Ethylene | 10.285 | 3.174 | 7.541 | 10.058 | 5.979 | 4.884 | 7.564 | 6.107 | 9.263 | 9.291 |
| Helium | 45.162 | 31.397 | 31.715 | 45.798 | 47.756 | 48.067 | 47.55 | 48.114 | 46.712 | 45.582 |
| Hydrogen | 10.73 | 0.259 | 0.35 | 0.856 | 0.363 | 0.176 | 0.96 | 1.567 | 2.474 | 0.468 |
| Methane | 0.486 | 0.771 | 1.713 | 0.462 | 0.277 | 0.262 | 0.505 | 0.323 | 0.429 | 0.442 |
| Oxygen | 0.07 | 0.076 | 0.072 | 0.07 | 0.056 | 0.074 | 0.068 | 0.064 | 0.075 | 0.092 |

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Acetylene | 0 | 0 | 0 | 0 | 0 | 0 | 0 | 0.007 | 0.004 | 0.013 |
| C3 | 0.031 | 0.076 | 0.012 | 0.053 | 0.025 | 0.04 | 0.03 | 0.047 | 0.049 |
| C4 | 0.025 | 0.072 | 0.008 | 0.042 | 0.016 | 0.024 | 0.028 | 0.023 | 0.029 |
| C5 | 0 | 0 | 0 | 0 | 0 | 0 | 0 | 0 | 0 |
| C6 | 0 | 0.003 | 0 | 0.002 | 0 | 0.001 | 0 | 0.002 | 0.002 |
| CO | 0 | 0 | 0 | 0 | 0 | 0 | 0 | 0 | 0 |
| $CO_2$ | 0.045 | 0.211 | 0.046 | 0.734 | 0.071 | 0.146 | 0.401 | 0.23 | 0.795 |
| Ethane | 38.109 | 29.145 | 41.511 | 30.511 | 36.897 | 35.377 | 35.582 | 32.54 | 29.386 |
| Ethylene | 7.064 | 11.301 | 3.647 | 10.099 | 7.044 | 7.874 | 7.49 | 9.961 | 10.515 |
| Helium | 50.042 | 45.207 | 48.842 | 44.998 | 46.645 | 45.478 | 48.103 | 44.73 | 45.289 |
| Hydrogen | 2.946 | 1.184 | 0.474 | 0.361 | 1.034 | 0.374 | 3.596 | 1.711 | 2.409 |
| Methane | 0.369 | 0.408 | 0.288 | 0.499 | 0.345 | 0.492 | 0.368 | 0.464 | 0.498 |
| Oxygen | 0.101 | 0.068 | 0.059 | 0.078 | 0.069 | 0.068 | 0.086 | 0.074 | 0.062 |

TABLE 3

Results for a reactor operating at 800° C.

|  | Ex. A | Ex. B | Ex. C | Ex. 1 | Ex. 2 | Ex. 3 | Ex. 4 | Ex. 5 | Ex. 6 | Ex. 7 |
|---|---|---|---|---|---|---|---|---|---|---|
| Acetylene | 0.057 | 0 | 0.067 | 0 | 0.009 | 0.005 | 0.007 | 0.018 | 0.104 | 0.041 |
| C3 | 0.246 | 0.006 | 0.027 | 0.29 | 0.2 | 0.169 | 0.263 | 0.208 | 0.343 | 0.306 |
| C4 | 0.029 | 0.001 | 0.005 | 0.025 | 0.03 | 0.034 | 0.017 | 0.025 | 0.035 | 0.015 |
| C5 | 0.002 | 0 | 0 | 0.008 | 0.001 | 0 | 0 | 0.001 | 0.008 | 0.003 |
| C6 | 0.013 | 0 | 0.001 | 0.02 | 0.009 | 0.007 | 0.015 | 0.012 | 0.033 | 0.027 |
| CO | 0 | 0 | 0 | 0 | 0 | 0 | 0 | 0 | 1.151 | 0 |
| $CO_2$ | 0.016 | 37.922 | 19.703 | 2.329 | 0.481 | 1.087 | 0.713 | 0.386 | 3.797 | 2.528 |
| Ethane | 0.004 | 2.844 | 6.058 | 8.747 | 19.484 | 21.478 | 15.256 | 17.483 | 6.382 | 9.907 |
| Ethylene | 20.21 | 1.815 | 10.159 | 17.908 | 16.705 | 14.838 | 18.72 | 17.902 | 19.201 | 19.088 |
| Helium | 38.229 | 27.765 | 31.33 | 35.209 | 41.087 | 42.277 | 39.814 | 40.839 | 37.305 | 37.301 |
| Hydrogen | 23.116 | 0.204 | 0.621 | 1.278 | 0.435 | 0.274 | 0.422 | 2.72 | 1.127 | 0.555 |

TABLE 3-continued

Results for a reactor operating at 800° C.

| | | | | | | | | | | |
|---|---|---|---|---|---|---|---|---|---|---|
| Methane | 2.277 | 2.749 | 3.964 | 2.022 | 1.482 | 1.362 | 2.149 | 1.611 | 2.445 | 1.994 |
| Oxygen | 0.116 | 0.065 | 0.066 | 0.068 | 0.067 | 0.07 | 0.077 | 0.078 | 0.07 | 0.069 |

| | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Acetylene | 0.019 | 0.079 | 0.007 | 0.039 | 0.056 | 0.013 | 0.053 | 0.167 | 0.132 |
| C3 | 0.237 | 0.457 | 0.139 | 0.314 | 0.277 | 0.229 | 0.183 | 0.33 | 0.3 |
| C4 | 0.026 | 0.026 | 0.024 | 0.016 | 0.018 | 0.015 | 0.23 | 0.036 | 0.012 |
| C5 | 0.001 | 0.009 | 0 | 0.004 | 0.005 | 0.001 | 0.002 | 0.008 | 0.005 |
| C6 | 0.012 | 0.032 | 0.004 | 0.028 | 0.026 | 0.014 | 0.009 | 0.033 | 0.026 |
| CO | 0 | 0.636 | 0 | 0.558 | 0 | 0 | 0.164 | 1.571 | 0 |
| CO$_2$ | 0.313 | 1.898 | 0.348 | 2.86 | 1.509 | 1.134 | 1.19 | 4.705 | 6.514 |
| Ethane | 21.49 | 6.74 | 24.01 | 9.208 | 10.847 | 15.395 | 17.094 | 5.988 | 0.004 |
| Ethylene | 20.652 | 19.389 | 14.021 | 18.756 | 18.858 | 17.776 | 17.084 | 18.292 | 20.602 |
| Helium | 48.05 | 35.874 | 42.792 | 37.076 | 37.854 | 39.235 | 40.385 | 36.421 | 37.385 |
| Hydrogen | 4.032 | 1.529 | 0.663 | 0.456 | 1 | 0.386 | 6.65 | 1.275 | 2.76 |
| Methane | 1.985 | 2.27 | 1.379 | 2.04 | 1.794 | 2.039 | 1.693 | 2.359 | 2.87 |
| Oxygen | 0.06 | 0.067 | 0.067 | 0.058 | 0.056 | 0.081 | 0.079 | 0.068 | 0.076 |

TABLE 4

Results for a reactor operating at 850° C.

| | Ex. A | Ex. B | Ex. C | Ex. 1 | Ex. 2 | Ex. 3 | Ex. 4 | Ex. 5 | Ex. 6 | Ex. 7 |
|---|---|---|---|---|---|---|---|---|---|---|
| Acetylene | 0.374 | 0 | 0.046 | 0 | 0.043 | 0.033 | 0.031 | 0.064 | 0.167 | 0.125 |
| C3 | 0.272 | 0.001 | 0.048 | 0.392 | 0.4 | 0.397 | 0.428 | 0.347 | 0.416 | 0.469 |
| C4 | 0.006 | 0 | 0.003 | 0.029 | 0.016 | 0.003 | 0.007 | 0.017 | 0.018 | 0.009 |
| C5 | 0.001 | 0 | 0 | 0.007 | 0.001 | 0 | 0 | 0.003 | 0.005 | 0.002 |
| C6 | 0.021 | 0 | 0 | 0.019 | 0.027 | 0.025 | 0.032 | 0.028 | 0.019 | 0.03 |
| CO | 0 | 0 | 6.546 | 8.182 | 0 | 0.26 | 0 | 0.392 | 2.109 | 1.647 |
| CO$_2$ | 0.034 | 40.178 | 11.773 | 5.2 | 2.041 | 3.971 | 3.768 | 1.002 | 10.517 | 6.412 |
| Ethane | 3.78 | 0.063 | 1.987 | 1.036 | 5.416 | 6.109 | 3.118 | 4.651 | 1.013 | 1.8 |
| Ethylene | 21.143 | 0.076 | 7.637 | 14.22 | 21.068 | 19.702 | 20.393 | 21.244 | 14.184 | 17.509 |
| Helium | 34.94 | 27.979 | 26.372 | 32.896 | 37.212 | 37.038 | 35.575 | 35.669 | 35.673 | 36.219 |
| Hydrogen | 29.119 | 0.058 | 17.864 | 3.016 | 0.362 | 0.278 | 0.359 | 4.507 | 0.696 | 0.779 |
| Methane | 6.057 | 3.08 | 6.384 | 4.796 | 4.38 | 4.149 | 5.661 | 4.755 | 5.547 | 4.897 |
| Oxygen | 0.076 | 0.086 | 0.069 | 0.06 | 0.068 | 0.065 | 0.061 | 0.071 | 0.072 | 0.068 |

| | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Acetylene | 0.159 | 0.131 | 0.039 | 0.14 | 0.221 | 0.052 | 0.172 | 0.467 | 0.312 |
| C3 | 0.575 | 0.44 | 0.412 | 0.495 | 0.435 | 0.382 | 0.292 | 0.34 | 0.325 |
| C4 | 0.02 | 0.013 | 0.002 | 0.015 | 0.021 | 0.009 | 0.459 | 0.02 | 0.02 |
| C5 | 0.004 | 0.002 | 0 | 0.003 | 0.006 | 0.001 | 0.002 | 0.006 | 0.005 |
| C6 | 0.044 | 0.031 | 0.028 | 0.029 | 0.025 | 0.026 | 0.019 | 0.013 | 0.012 |
| CO | 0.918 | 0.874 | 0 | 1.788 | 2.478 | 0 | 0.784 | 4.97 | 0 |
| CO$_2$ | 2.44 | 1.507 | 1.927 | 7.024 | 6.886 | 5.348 | 1.268 | 11.586 | 18.265 |
| Ethane | 5.047 | 3.941 | 6.767 | 1.794 | 1.376 | 3.516 | 4.604 | 0.592 | 0.002 |
| Ethylene | 27.961 | 20.334 | 21.696 | 17.554 | 15.867 | 19.431 | 19.757 | 11.032 | 12.842 |
| Helium | 49.019 | 36.115 | 35.126 | 34.317 | 36.807 | 36.903 | 33.632 | 35.114 | 37.329 |
| Hydrogen | 2.318 | 1.754 | 0.627 | 0.687 | 0.902 | 0.336 | 12.755 | 1.04 | 1.679 |
| Methane | 6.603 | 4.66 | 4.284 | 5.279 | 4.589 | 4.958 | 4.967 | 4.723 | 6.244 |
| Oxygen | 0.083 | 0.063 | 0.054 | 0.067 | 0.075 | 0.063 | 0.07 | 0.065 | 0.077 |

The results provided in Tables 1-4 show that for the oxygen carrier materials of Comparative Examples B and C and Examples 1-16, the percentage of hydrogen in the product stream was generally lower than for Comparative Example A, which does not include an oxygen carrier. The results provided in Tables 1-4 also show that for the oxygen carrier materials of Comparative Examples B and C, which do not include a shell material, the percentage of carbon oxides, including carbon dioxide and carbon oxide, in the product stream was generally higher than for each of the Examples. The results provided in Tables 1-4 also show that for the oxygen carrier materials of Examples 15 and 16, which have only enough shell material to form a coating with thickness of one or less than one crystalline unit cell, respectively, the percentage of carbon oxides, including carbon dioxide and carbon oxide, in the product stream was generally higher than for each of the Examples 1-14 and was generally lower than for Comparative Examples B and C.

Referring to Table 1, showing the results of the process run at 700° C., reactors utilizing Comparative Examples B and C and Examples 1-16 resulted in a percentage of hydrogen in the product stream that was less than the percentage of hydrogen in the product stream for Comparative Example A. For reactors utilizing each of Examples 1-16, the percentage of carbon oxides, including carbon dioxide and carbon oxide, was less than the product stream for each of Comparative Examples B and C.

Referring to Table 2, showing the results of the process run at 750° C., reactors utilizing Comparative Examples B and C and Examples 1-16 resulted in a percentage of hydrogen in the product stream that was less than the percentage of hydrogen in the product stream for Comparative Example A. For reactors utilizing each of Examples 1-16, the percentage of carbon oxides, including carbon dioxide and carbon oxide, was less than the product stream for each of Comparative Examples B and C.

Referring to Table 3, showing the results of the process run at 800° C., reactors utilizing Comparative Examples B and C and Examples 1-16 resulted in a percentage of hydrogen in the product stream that was less than the percentage of hydrogen in the product stream for Comparative Example A. For reactors utilizing each of Examples 1-16, the percentage of carbon oxides, including carbon dioxide and carbon oxide, was less than the product stream for each of Comparative Examples B and C. For reactors utilizing each of Examples 15 and 16, the percentage of carbon oxides, including carbon dioxide and carbon oxide, was less than the product stream for each of Comparative Examples B and C and more than the product stream of each of Examples 1-14.

Referring to Table 4, showing the results of the process run at 850° C., reactors utilizing Comparative Examples B and C and Examples 1-16 resulted in a percentage of hydrogen in the product stream that was less than the percentage of hydrogen in the product stream for Comparative Example A. For reactors utilizing each of Examples 1-16, the percentage of carbon oxides, including carbon dioxide and carbon oxide, was less than the product stream for each of Comparative Examples B and C. For reactors utilizing each of Examples 15 and 16, the percentage of carbon oxides, including carbon dioxide and carbon oxide, was less than the product stream for each of Comparative Examples B and C and more than the product stream of each of Examples 1-14.

Example 2 and Example 5

Figure 5:
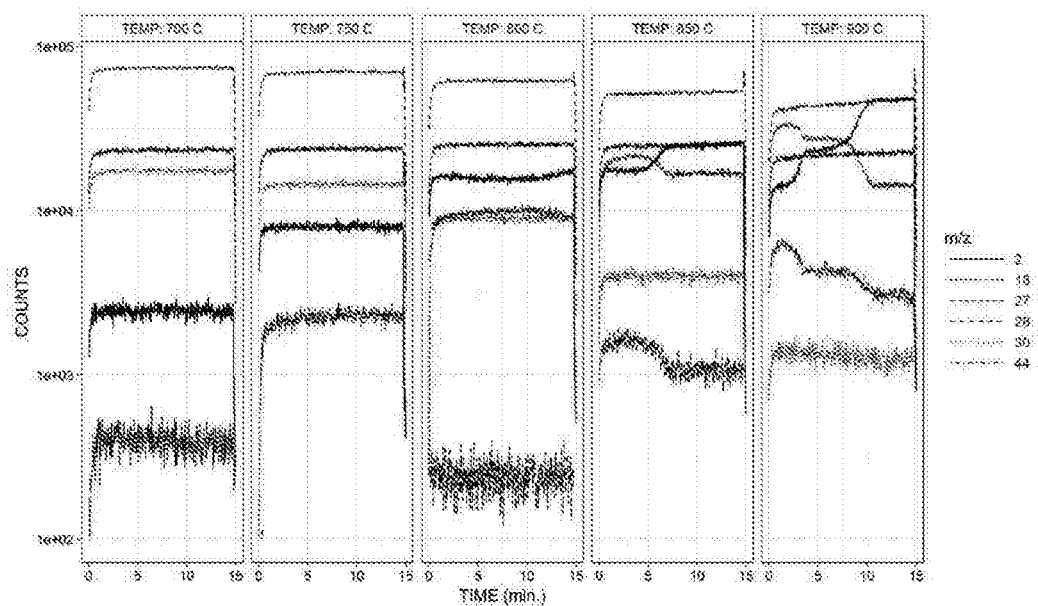
FIG. 5 is a schematic depiction of the signal intensity of product stream composition, as measured by Mass Spectrometry, for a fixed bed reactor operating at temperatures between 700° C. and 900° C. with a feed flow of 35 standard cubic centimeters per minute (sccm) comprising 5 vol. % ethane and 95 vol. % helium through a 9.5 mm ID quartz reactor tube loaded with 150 mg of the Example Material 2, according to one or more embodiments of the present disclosure.
Figure 6:
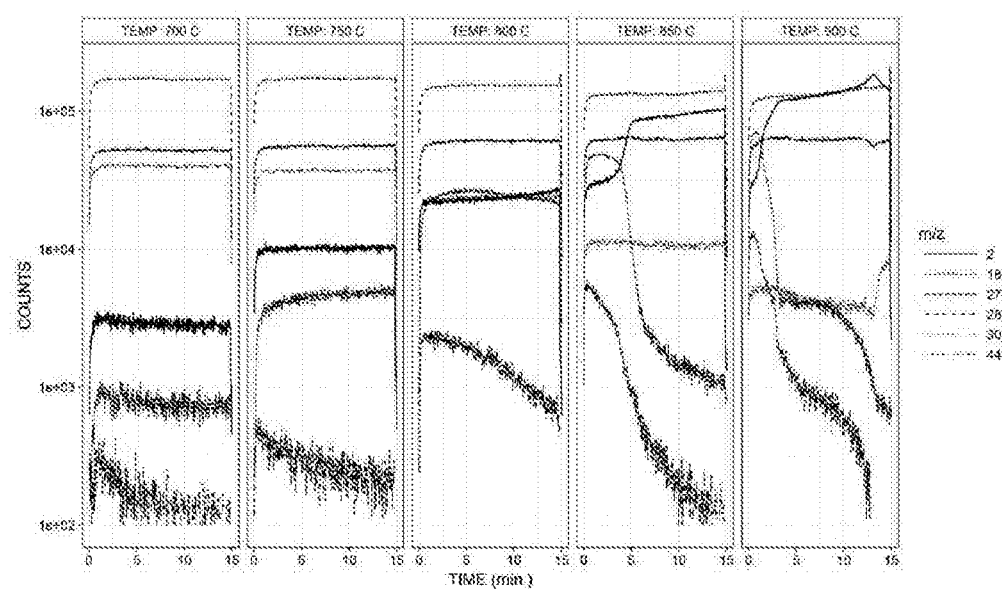
FIG. 6 is a graphical depiction of the signal intensity of product stream composition, as measured by Mass Spectrometry, for a fixed bed reactor operating at temperatures between 700° C. and 900° C. with a feed flow of 35 sccm comprising 5 vol. % ethane and 95 vol. % helium through a 9.5 mm ID quartz reactor tube loaded with 150 mg of the Example Material 5, according to one or more embodiments of the present disclosure.
Figure 7:
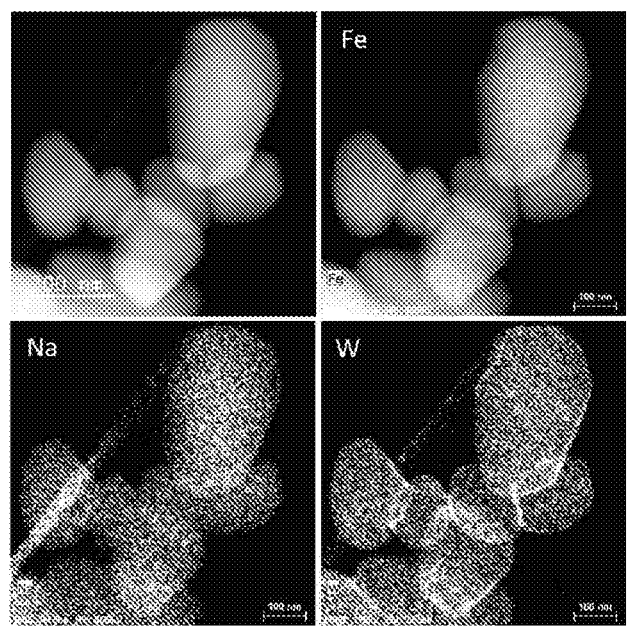
FIG. 7 is a Transmission Electron Micrograph with EDS elemental mapping of Example Material 2, according to one or more embodiments of the present disclosure.
Figure 8:
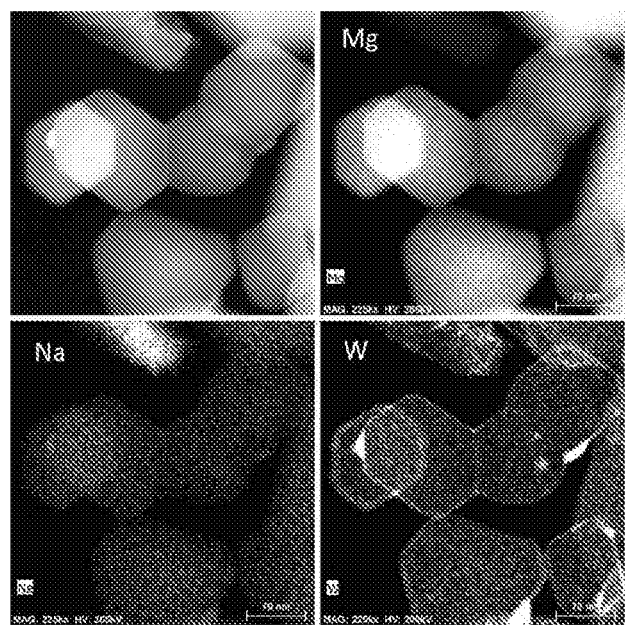
FIG. 8 is a Transmission Electron Micrograph with EDS elemental mapping of Example Material 5, according to one or more embodiments of the present disclosure.
Figure 9:
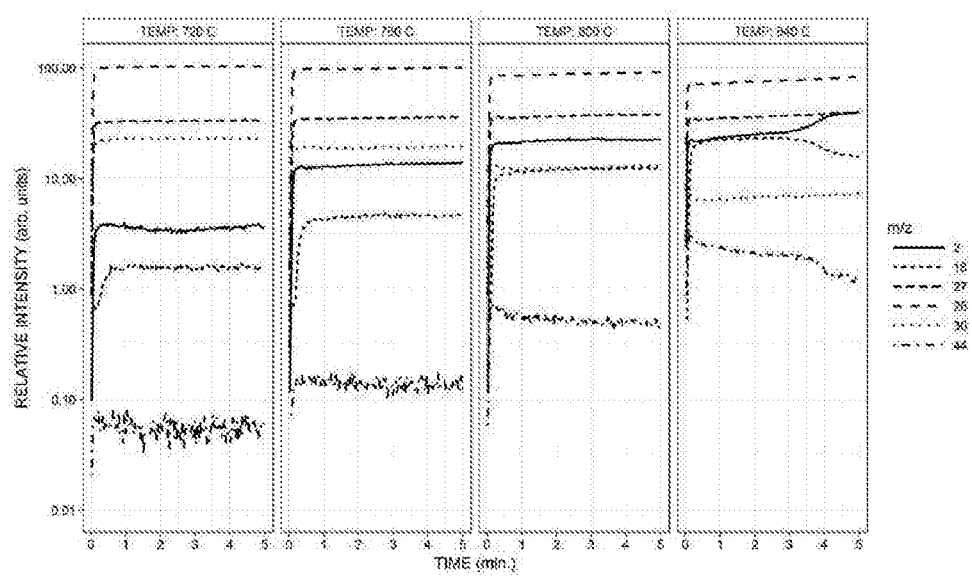
FIG. 9 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example Material 17, according to one or more embodiments of the present disclosure.
Figure 10:
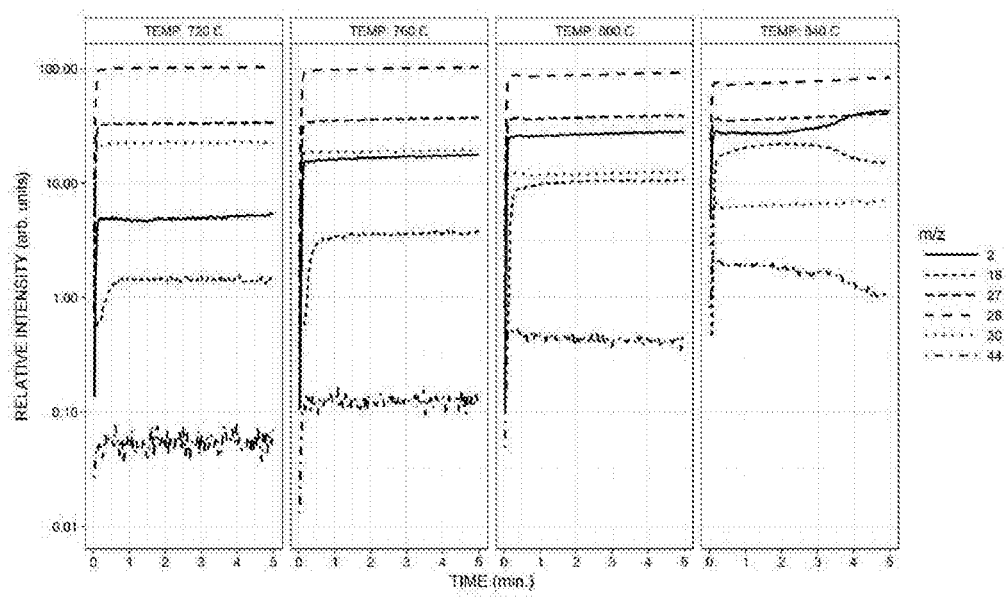
FIG. 10 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example Material 18, according to one or more embodiments of the present disclosure.
Figure 11:
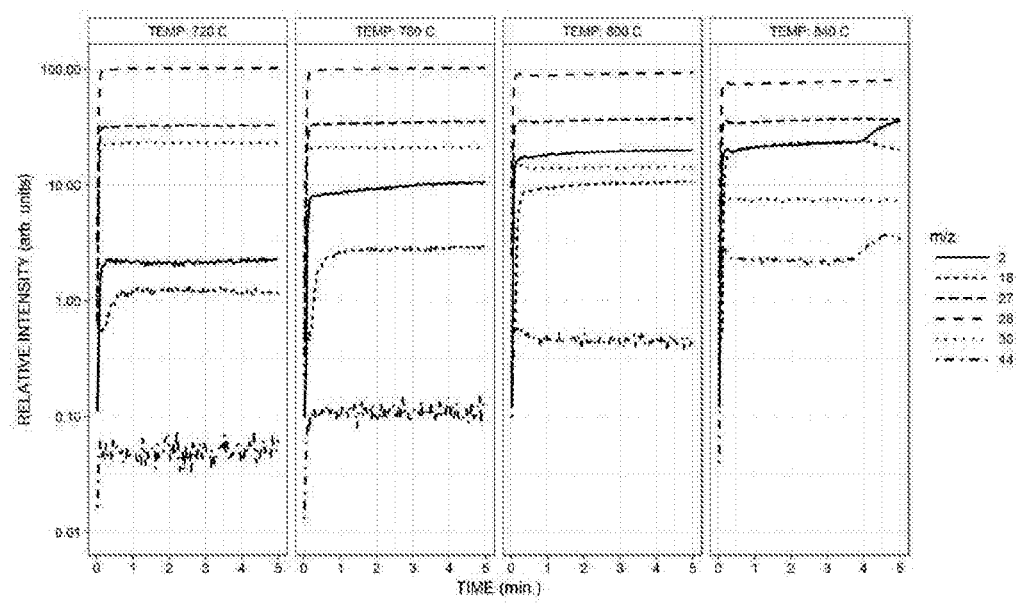
FIG. 11 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example Material 19, according to one or more embodiments of the present disclosure.
Figure 12:
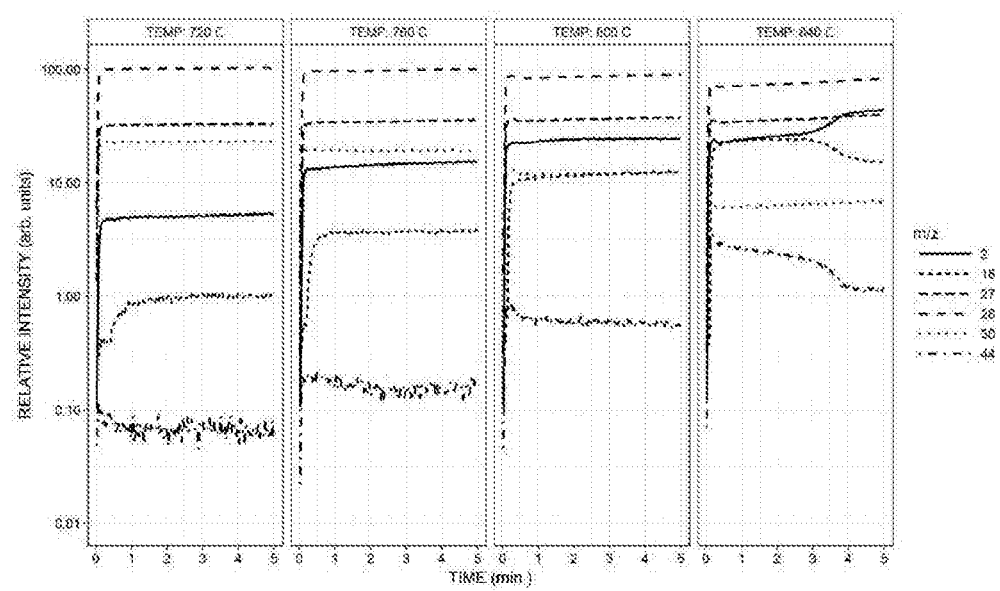
FIG. 12 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example Material 20, according to one or more embodiments of the present disclosure.
Figure 13:
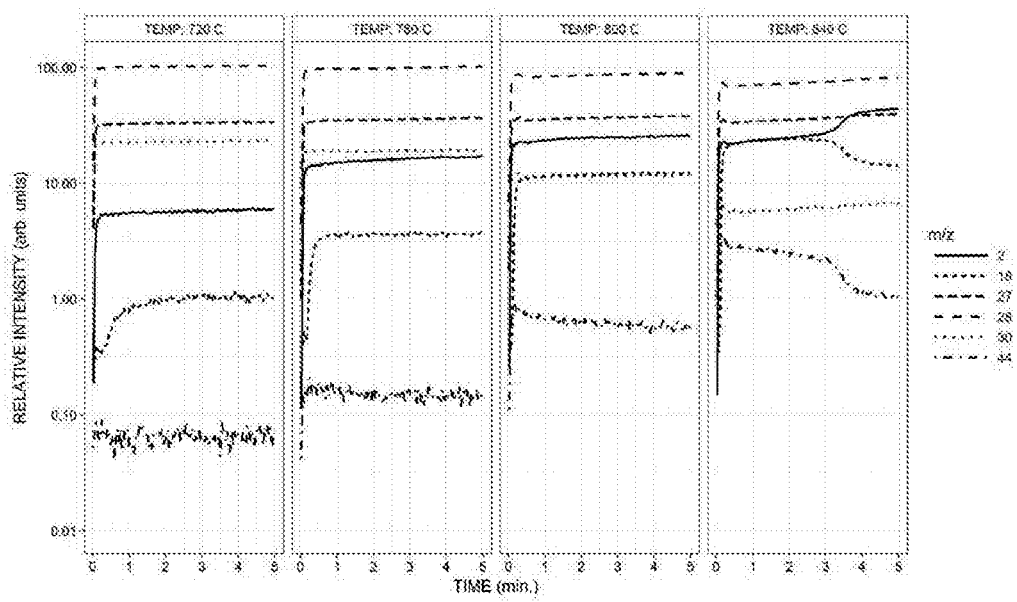
FIG. 13 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example Material 21, according to one or more embodiments of the present disclosure.
Figure 14:
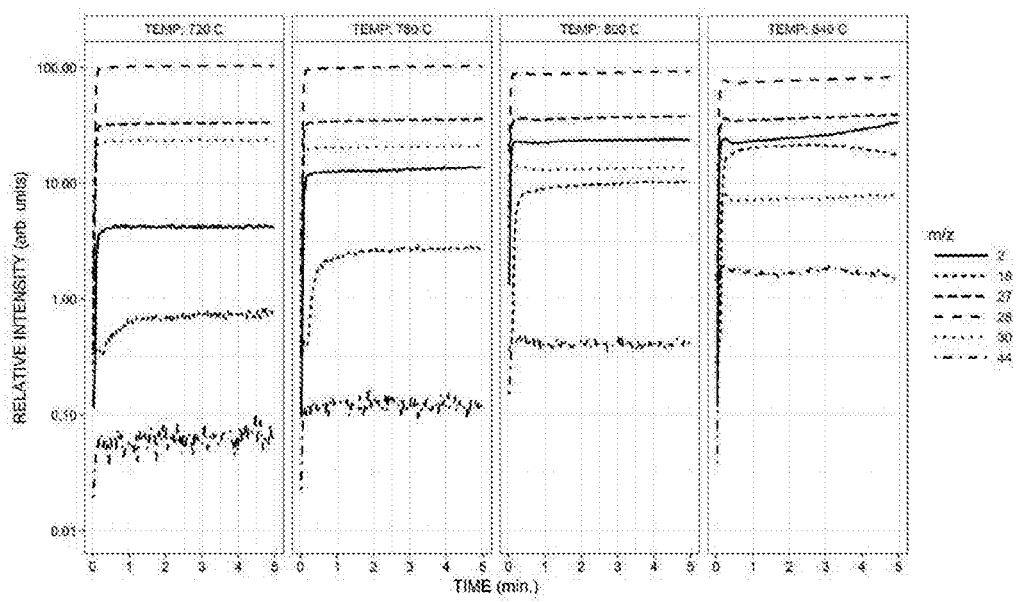
FIG. 14 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example Material 22, according to one or more embodiments of the present disclosure.

Referring now to FIG. 5, the signal intensity of product stream composition, as measured by Mass Spectrometry, is depicted for a fixed bed reactor operating at temperatures between 700° C. and 900° C. with a feed flow of 35 sccm comprising 5 vol. % ethane and 95 vol. % helium through a 9.5 mm ID quartz reactor tube loaded with 150 mg of the Example 2 ($Fe_2O_3$/Na,W). Referring now to FIG. 6, the signal intensity of product stream composition, as measured by Mass Spectrometry, is depicted for a fixed bed reactor operating at temperatures between 700° C. and 900° C. with a feed flow of 35 sccm comprising 5 vol. % ethane and 95 vol. % helium through a 9.5 mm ID quartz reactor tube loaded with 150 mg of the Example 5 ($Mg_6MnO_8$/Na,W). FIG. 7, provides a Transmission Electron Micrograph with EDS elemental mapping of Example 2 ($Fe_2O_3$/Na,W). FIG. 8 shows a Transmission Electron Micrograph with EDS elemental mapping of Example 5 ($Mg_6MnO_8$/Na,W).

Examples 17 Through 23

Figure 15:
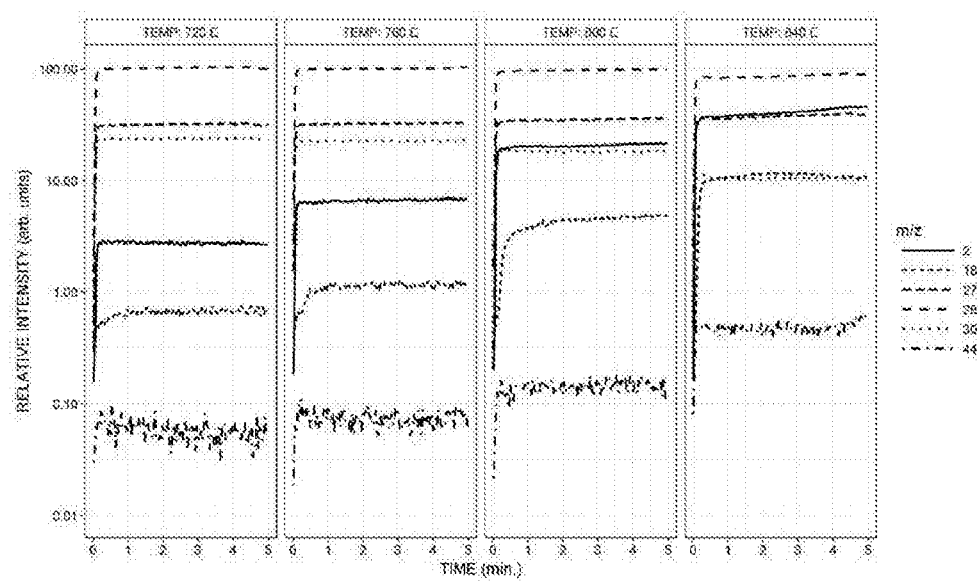
FIG. 15 is a graphical depiction of the signal intensity of product stream composition, as measured by Mass Spectrometry, for a fixed bed reactor operating at temperatures between 720° C. and 840° C. with a feed flow of 35 sccm comprising 5 vol. % ethane and 95 vol. % helium through a 9.5 mm ID quartz reactor tube loaded with 76 mg of the Example Material 23, according to one or more embodiments of the present disclosure.
Figure 16:
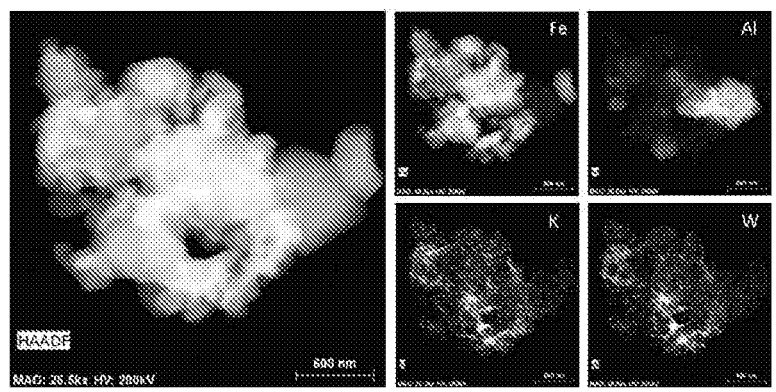
FIG. 16 is a Transmission Electron Micrograph with EDS elemental mapping of Example Material 18, according to one or more embodiments of the present disclosure.

Referring now to FIGS. 9-14, the signal intensity of product stream composition as a function of time, as measured by Mass Spectrometry, is depicted for a fixed bed reactor operating at temperatures between 720° C. and 840° C. with a feed flow of 35 sccm comprising 5 vol. % ethane and 95 vol. % helium through a 9.5 mm ID quartz reactor tube loaded with 150 mg of the Example 17 through Example 22 materials, respectively. Referring now to FIG. 15, the signal intensity of product stream composition as a function of time, as measured by Mass Spectrometry, is depicted for a fixed bed reactor operating at temperatures between 720° C. and 840° C. with a feed flow of 35 sccm comprising 5 vol. % ethane and 95 vol. % helium through a 9.5 mm ID quartz reactor tube loaded with 76 mg of the Example 23. FIG. 16, provides a Transmission Electron Micrograph with EDS elemental mapping of Example 18 ($Fe_2O_3$/$K_2WO_4$/gamma-alumina). The inclusion of the support material may allow for the physical properties of the hydrogen-selective oxygen carrier material to be adjusted. In comparison to embodiments that do not include a support material, the amount of, the type, and the manner in which the support material is incorporated may allow for the solids residence time in the circulating fluidized bed reactor to be adjusted, may allow for the attrition resistance of the hydrogen-selective oxygen carrier material to be modified, may allow for the dispersion of the redox-active transition metal oxide near the surface of hydrogen-selective oxygen carrier material, and may allow for the retention of selectivity towards hydrogen combustion upon attrition.

The present disclosure shows that there is a need for oxygen carrier materials with high selectivity for hydrogen combustion at elevated temperatures in the presence of hydrocarbons (paraffins and olefins) under a non-oxidative environment (i.e. in the absence of molecular oxygen). Embodiments of the present disclosure meet those needs by providing a conformal coating, or shell, of an alkali transition metal oxide around a redox-active metal oxide core. Without the shell, the core combusts both hydrogen and hydrocarbon similar to conventional oxygen carrier materials, such as those used for chemical looping combustion processes. As such, the presently disclosed hydrogen-selective oxygen carrier materials allow for economical and efficient processes for converting hydrocarbons. For example, the presently disclosed hydrogen-selective oxygen carrier materials allow for the complete or partial removal of hydrogen, which may subsequently reduce downstream separation costs.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A method of producing a hydrogen-selective oxygen carrier material, the method comprising:
combining one or more core material precursors, one or more shell material precursors, and one or more support materials to form a precursor mixture; and
heat-treating the precursor mixture at a treatment temperature to form the hydrogen-selective oxygen carrier material, wherein the treatment temperature is greater than or equal to 100° C. less than the melting point of a shell material; and
wherein the hydrogen-selective oxygen carrier material comprises a core comprising a core material and a shell comprising the shell material, wherein the shell material is in direct contact with at least a majority of an outer surface of the core material, and wherein the shell material comprises one or more alkali transition metal oxides comprising:
one or more of Na, Li, K, or Cs; and
one or more of W, or Mo wherein the one or more core material precursors are formed prior to combining the one or more core material precursors and the one or more shell material precursors, and wherein the one or more core material precursors comprises two or more transition metal oxides.

2. The method of claim 1, wherein the one or more core material precursors consists of a single core material precursor and the one or more shell material precursors consists of a single shell material precursor.

3. The method of claim 1, further comprising forming the one or more shell material precursors prior to combining the one or more core material precursors and one or more shell material precursors.

4. The method of claim 1, wherein the precursor mixture comprises at least two shell material precursors, and wherein the at least two shell material precursors react to form the shell material during the heat-treating.

5. The method of claim 1, wherein the one or more core material precursors and the one or more shell material precursors are combined in a solution to form the precursor mixture.

6. The method of claim 1, wherein the combining of the one or more core material precursors and the one or more shell material precursors comprises physically mixing the one or more core material precursors in a dry powder state with the one or more shell material precursors in a dry powder state.

7. The method of claim 1, further comprising drying the precursor mixture prior to the heat-treating.

8. The method of claim 1, wherein the heat-treating is at a temperature of less than the melting point of the core material.

9. The method of claim 1, wherein the precursor mixture is heat treated for about 0.5 hours to about 12 hours.

10. The method of claim 1, wherein the core material comprises a redox-active transition metal oxide.

11. The method of claim 1, further comprising combining the one or more core material precursors the one or more support materials separately before combining the one or more shell material precursors.

12. The method of claim 10, wherein the redox-active transition metal oxide is chosen from $Mn_2O_3$, $Fe_2O_3$, $CO_3O_4$, $CuO$, $(LaSr)CoO_3$, $(LaSr)MnO_3$, $Mg_6MnO_8$, $MgMnO_3$, $MnO_2$, $Fe_3O_4$, $Mn_3O_4$, or $Cu_2O$.

* * * * *